(12) United States Patent
Rasanen

(10) Patent No.: US 10,802,644 B2
(45) Date of Patent: Oct. 13, 2020

(54) ASSISTIVE TEXT-ENTRY SYSTEM AND METHOD

(71) Applicant: Wayne Rasanen, New Port Richey, FL (US)

(72) Inventor: Wayne Rasanen, New Port Richey, FL (US)

( * ) Notice: Subject to any disclaimer, the term of this patent is extended or adjusted under 35 U.S.C. 154(b) by 0 days.

(21) Appl. No.: 15/940,830

(22) Filed: Mar. 29, 2018

(65) Prior Publication Data

US 2018/0300008 A1 Oct. 18, 2018

Related U.S. Application Data

(60) Provisional application No. 62/481,762, filed on Apr. 5, 2017.

(51) Int. Cl.
*G06F 3/041* (2006.01)
*G06F 3/0488* (2013.01)
*G06F 3/01* (2006.01)

(52) U.S. Cl.
CPC ............ *G06F 3/0416* (2013.01); *G06F 3/013* (2013.01); *G06F 3/017* (2013.01); *G06F 3/04883* (2013.01); *G06F 3/04886* (2013.01); *G06F 2203/04106* (2013.01)

(58) Field of Classification Search
CPC .............. G06F 3/0416; G06F 3/04883; G06F 3/04886; G06F 3/0482; G06F 3/0488; G06F 3/01; G09G 5/02
USPC ........................................................ 345/173
See application file for complete search history.

(56) References Cited

U.S. PATENT DOCUMENTS

| | | | | |
|---|---|---|---|---|
| 2008/0029691 A1* | 2/2008 | Han | ..................... | G06F 3/04883 250/224 |
| 2011/0117535 A1* | 5/2011 | Benko | ...................... | G09B 5/02 434/365 |
| 2011/0219340 A1* | 9/2011 | Pathangay | ................ | G06F 3/01 715/863 |
| 2012/0268389 A1* | 10/2012 | Yaron | ................... | G06F 3/0416 345/173 |
| 2013/0183946 A1* | 7/2013 | Jeong | .................... | G10L 15/265 455/414.1 |
| 2013/0239206 A1* | 9/2013 | Draluk | ................... | G06F 21/00 726/19 |
| 2014/0347491 A1* | 11/2014 | Connor | ................. | A61B 5/1114 348/158 |
| 2015/0109242 A1* | 4/2015 | Wei | ........................ | G06F 3/044 345/174 |
| 2015/0168365 A1* | 6/2015 | Connor | ................. | G01N 33/02 356/51 |

(Continued)

*Primary Examiner* — Fred Tzeng
(74) *Attorney, Agent, or Firm* — Chris Tanner; TannerPatent.com

(57) ABSTRACT

A touch-screen/gesture based keyboard using gestures on defined zones for providing keyboard input that is simplified to accommodate a small area, doesn't require eye-hand coordination, and can be used with as few as one finger on the same hand holding the device, without looking or employed in Virtual or Augmented applications. The inventive device includes a software application running on a position and movement detection device to provide keyboard operations. The app is a code that runs on a computer device and provides for zones that are monitored for movement, applying that movement to a prescribed chart and delivering the resulting feedback as keystrokes.

22 Claims, 33 Drawing Sheets

(56) References Cited

U.S. PATENT DOCUMENTS

| | | | |
|---|---|---|---|
| 2015/0331399 A1* | 11/2015 | Hackl | G06F 3/0488 700/83 |
| 2015/0355727 A1* | 12/2015 | Hu | G06F 3/04886 345/169 |
| 2015/0378982 A1* | 12/2015 | McKenzie | G06F 3/0482 715/261 |
| 2016/0005150 A1* | 1/2016 | Ghassabian | G06F 3/0488 345/654 |
| 2016/0140870 A1* | 5/2016 | Connor | G09B 19/0092 356/51 |
| 2016/0357301 A1* | 12/2016 | Padiri | G06F 3/0416 |
| 2017/0003798 A1* | 1/2017 | Peng | G06F 3/0488 |
| 2017/0010799 A1* | 1/2017 | Yaron | G06F 3/04883 |
| 2017/0168580 A1* | 6/2017 | Allen | G06F 17/274 |
| 2017/0269828 A1* | 9/2017 | Gorlich | G06F 21/31 |
| 2017/0277338 A1* | 9/2017 | Suo | G06F 3/0416 |
| 2018/0081539 A1* | 3/2018 | Ghassabian | G06F 3/04886 |
| 2018/0210643 A1* | 7/2018 | Ghassabian | G06F 3/0237 |
| 2018/0311574 A1* | 11/2018 | Kawahara | A63F 13/2145 |

* cited by examiner

| Normal | Num Lock | combination | Normal | Num Lock | combination |
|---|---|---|---|---|---|
| a | | 1- | ? | ? | 1_2_3 |
| b | | 2- | ! | ! | 1_2_3_4 |
| c | | 3- | tab | tab | 2_3_4 |
| d | | 4- | , | , | 3_4 |
| e | | 5 up | (')apostrophe | (')apostrophe | 4_3 |
| f | | 6 down | " | " | 3_2_1 |
| g | | 1+ | # | # | 4_3_2 |
| h | | 2+ | @ | @ | 4_3_2_1 |
| i | | 3+ | enter | enter | 5_2_3 |
| j | | 4+ | cursor up | cursor up | 5_3 |
| k | | 5- 1- | cursor dwn | cursor dwn | 3_5 |
| l | | 5- 2- | num lock | num lock off | 4_3_2_5 |
| m | | 5- 3- | | | 1 1- |
| n | | 5- 4- | | | 2 2- |
| o | | 5- 1+ | | | 3 3- |
| p | | 5- 2+ | | | 4 4- |
| q | | 5- 3+ | | | 5 5 up |
| r | | 5- 4+ | | | 6 5 down |
| s | | 5+ 1- | | | 7 1+ |
| t | | 5+ 2- | | | 8 2+ |
| u | | 5+ 3- | 0 | | 4+ |
| v | | 5+ 4- | / | | 5- 1- |
| w | | 5+ 1+ | \ | | 5- 1+ |
| x | | 5+ 2+ | < | | 5- 2- |
| y | | 5+ 3+ | > | | 5- 2+ |
| z | | 5+ 4+ | : | | 5- 3- |
| shift | shift | 5_4 | $ | | 5- 3+ |
| space | space | 2_3 | ; | | 5_4- |
| back space | back space | 3_2 | % | | 5- 4+ |
| . | . | 1_2 | (+)Plus | | 5+ 1- |
| | | | (=)Equals | | 5+ 1+ |
| | | | * | | 5+ 2- |
| | | | ~ | | 5+ 2+ |
| | | | ( | | 5+ 3- |
| | | | _ | | 5+ 3+ |
| | | | ) | | 5+ 4- |
| | | | (-)Hyphen | | 5+ 4+ |

FIG. 4

In the outer zones, movement is measured from the initial press to forward or backward Movement is measured in four directions in the inner zone Movement is measured from one zone to another in any direction Tongue operated keyboard in a user's mouth upper palate appliance.

stencil 2600

ASSISTIVE TEXT-ENTRY SYSTEM AND METHOD

FIELD OF THE EMBODIMENTS

This disclosure relates generally to input techniques using touchscreen input and gesture recognition more specifically it relates to a touch-sensitive keyboard using straight line gestures on finger defined zones for providing a touch sensitive, gesture based keyboard that is simplified to accommodate a small area, doesn't require eye-hand coordination, provides alpha and numeric characters, symbols and functions for effective computer input, and can be used with as few as one finger on the same hand holding the device or in an alternate configuration, with just the users tongue. Assistive technology configurations can also be made to accommodate using feet, elbows or eye movement for selecting or composing keystrokes using this zone straight line gesture based technology that applies basic movements to a deliberate alphabetic structure. Curved lines may also be used to apply the same principals of this methodology if desired

BACKGROUND

It can be appreciated that touchscreen keyboards have been in use for years. A touchscreen is an input and/or output terminal normally utilizing technology layered on the top of an electronic visual display of a portable device. A user can give input through simple or multi-touch gestures by touching the screen with a special stylus or one or more fingers. Typically, touchscreen keyboards are comprised of a touch sensitive screen with virtual keyboards most often based on QWERTY. Systems utilizing pattern recognition typically focus on the shape of the gesture, such as a bend or a hook to help determine the intended keystroke. More elaborate gestures such as those used for writing on a touchscreen may have very nuanced and subtle changes in shape or direction. Application such as graffiti developed by Palm in the 1990s relied on a library of prescribed gestures to accomplish keystrokes. Character recognition relied on drawing aspects of the letter desired within the specified zone which the computer attempted to interpret and output as keystrokes. Other examples of gesture typing rely on crossing over subject points on an on-screen virtual keyboard with a sweeping motion that requires eye hand coordination for most tasks.

An additional depiction of gesture movement input was seen in the futuristic movie "Minority Report" where broad gestures were used to accomplish tasks in a virtual space. This gesture-based keyboard technique defines actions that could be utilized in a similar manor as those seen in the movie such as the keystroke "tab" being a sweep of a finger in virtual space from zone 2 to zone 4, as described in more detail herein. The gesture-based input technology described herein is primarily in basic singular straight-line movement without the nuanced looping gestures for keystrokes used in the past. The embodiments herein also sometimes utilize a chording technique of moving two contacts, either sequentially or in parallel, to differentiate the output of the straight-line gestures in each zone of the system. In some cases the preferred interface is reduced to only one zone containing as few as five contact points. Measuring the movement and direction of a gesture across a contact point correlates to the creation of keystrokes.

One potential problem with conventional touchscreen keyboards, especially on a mobile device, is that there are dozens of buttons on a small screen, making them difficult to press accurately. Another problem with conventional touchscreen keyboards is that visual attention and eye-hand coordination are usually required to type accurately, thus removing attention from changing circumstances. By requiring visual attention, situation awareness is compromised, leading to accidents and causing the passage of restrictive legislation, counter to the advancement of technology. Another problem is that they require significant space to accommodate a broad set of keystrokes and don't fit within a small area such as on a smart watch, clothing, wearable, or various Internet-of-things devices. Gesture-based character input technology is prone to error due to the demanding number of nuanced loops and variations for each keystroke. Gesture recognition can be confused by bad penmanship or physical conditions that effect user performance. By simplifying the actions required to compose keystrokes with simple straight-line gestures, this technique overcomes many of the issues of previous gesture recognition techniques.

Additionally, the embodiments described herein rely on certain aspects of Applicant's patented technology as described in U.S. Pat. No. 6,542,091 (the entire contents of which are hereby incorporated by reference into this disclosure) which defined computer input utilizing ten keys.

While these devices may be suitable for the particular purpose to which they address, they are not as suitable for providing a touch-style gesture based keyboard input that is simplified to accommodate a small area, doesn't require eye-hand coordination or visual attention, requires no generation of on-screen symbols, letters or numbers or feedback in any manner, can be used with as few as one finger on the same hand holding the device, and can be used without looking. For example, the embodiments herein also provide for a control surface suitable for a pilot who can't pull over to text or adjust a GPS heading.

The main problem with conventional touchscreen keyboards are that there are dozens of buttons on a small screen making them difficult to press accurately, especially on a mobile device. Another problem is both visual attention and eye-hand coordination are required to type accurately, thus resulting in a diversion of attention. Also, another problem is significant space is required to accommodate a broad set of keystrokes and become less usable when applied within a small area, such as on a smart watch or the surface of a small touch sensitive device.

Consequently, an improved system and method for accepting user-input is desired.

OBJECTS OF THE INVENTION

A primary object of the present invention is to provide a touch-sensitive keyboard using gestures on defined zones to provide input that will overcome the shortcomings of the prior art devices.

An object of the present invention is to provide a gesture based input technique using gestures on defined zones for providing a touch-screen keyboard, a symbol-table or communications tool that is simplified to accommodate a small area, doesn't require eye-hand coordination, and can be used with as few as one finger on the same hand holding the device, without looking.

Another object is to provide gesture based keyboard using gestures on defined zones that provides touch-typing on a touch screen or other sensitive or reactive surfaces.

Another object is to provide a gesture based keyboard or a symbol-table such as emoticons using gestures on defined zones that only requires one finger to operate.

Another object is to provide a gesture based keyboard or a symbol-table using gestures on defined zones that works on a small area on a touch screen or touch sensitive device or may be observed moving in defined zones.

Another object is to provide a gesture based keyboard using gestures on defined zones that can be used with the same hand that is holding the device.

Another object is to provide a gesture-based keyboard using gestures on defined zones that operates as a communications and/or control tool with a wide variety of keystrokes.

Another object is to provide a touch-sensitive keyboard using gestures on defined zones that does not require eye-hand coordination to operate.

Another object is to provide a keyboard design using gestures on defined zones that may appear or be observed in a virtual or augmented environment that may or may not require eye-hand coordination to operate. Another object is to provide a keyboard design using gestures on defined zones that may utilize tracking eye movement to construct keystrokes.

Another object is to provide a gesture based keyboard using gestures on defined zones that may employ some elements of my previously patented input technology in a brand new way.

Other objects and advantages of the present invention will become obvious to the reader and it is intended that these objects and advantages are within the scope of the present invention.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 shows spread sheet outlining a preferred configuration of keystrokes and how they are provided.

DETAILED DESCRIPTION OF THE PREFERRED EMBODIMENTS

In view of the foregoing disadvantages inherent in the known types of touchscreen keyboards and techniques now present in the prior art, the embodiments herein provide a new a touch-sensitive keyboard using gestures on defined zones, construction wherein the same can be utilized for providing a touch-sensitive keyboard or a communications tool that may be altered with various sets of instructions, that is simplified to accommodate a small area, doesn't require eye-hand coordination, and can be used with as few as one finger on the same hand holding the device or potentially even with one's tongue, without looking, and provides additional ways to communicate with computing devices. This method uses some simple gesture chords, where more than one movement is required to generate characters, although typically with only two fingers moving. For clarity, when using motion or gesture tracking it may be preferred to keep the fore fingers together as one unit, and use the thumb as the variant modifier. In the preferred configuration, both fingers move down together, up together, pinched together or spread apart from each other. One finger can also move side to side and up and down in the zones. These gesture chords can also be produced sequentially with only one finger where one finger moves back and forth in one of the zones and then a finger moves back or forward in another zone to complete the keystroke.

In these respects, the touch sensitive keyboard using gestures on defined zones according to the embodiments herein provides a system for data-entry to a touch-sensitive or gesture or motion tracked interface that is simplified to accommodate a small area, doesn't require eye-hand coordination (selected embodiments), and can be used with as few as one finger on the same hand holding the device, potentially without looking. The principle is to provide a wide set of keystrokes with simple movements on an area small enough to use on e.g. a smart watch, such that an external keyboard is no longer required for texting, entering credit card numbers or making phone calls. The data-entry interface may also be accommodated in a variety of ways including in the bottom corner of a smart phone or other touch screen devices and have the ability to scale to any size on the screen including large enough to fit onto all five fingers of a user's hand. The interface embodiments described herein may also be accommodated where no screen is present but rather on a surface that can detect\dispatch finger movement and may be of any suitable size, shape or material to accommodate measuring gesture movement.

Figure 13:
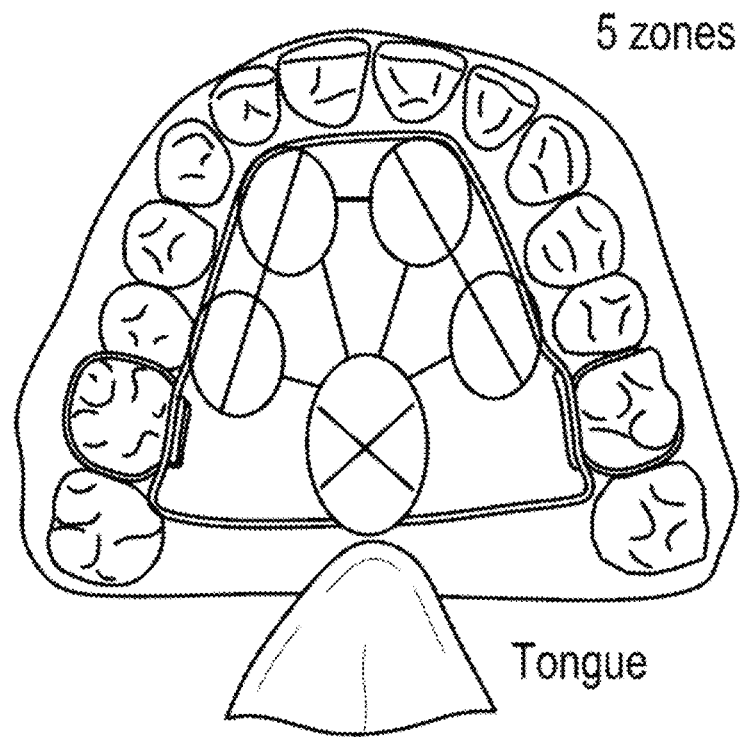
FIG. 13 shows how the interface of FIG. 12 could be used inside a user's mouth.

This design can also be applied such that an operators tongue could be used for generating gestures instead of one or more fingers where the human-interface may be applied inside a user's mouth like a denture, thus enabling data input for the severely disabled, example shown in FIG. 13.

It should be noted that the simple observation of a user's finger movements may be all that is necessary to convey communication or control to a device capable of tracking motion or observing a user movement. For example, sliding both a finger and thumb in an upward direction of the first zone could indicate the user was constructing a "W" keystroke or a single finger up provides a "G" keystroke and a pinch action there would indicate a "S" keystroke. Sliding a finger down in the first zone would indicate a "A" keystroke and sliding down two fingers indicates a "K" and separating the fingers produces an "O" keystroke. These straight line movements alone or in conjunction with a second finger are all that is required to provide a wide set of keystrokes that are easy to interpret and can be accomplished in an area much smaller than most other methods. This input technique can also be accomplished with the movement of any two appendages including elbows or feet to aid in control and communications for a variety of needs using this same zone methodology on a surface constructed to accommodate the desired body part.

The embodiments described herein provide a new and novel way of providing the applicant's previously disclosed technology, U.S. Pat. No. 6,542,091. However, the embodiments herein reduce the application from ten key-points to only five key-points, provide for additional keystrokes in a manner not previously disclosed, and eliminate presses and hardware embodiments to facilitating mainly software activation on a touch-enabled or virtual reality device. The embodiments herein also provide a significantly different way of providing input on a touchscreen without the need for observation or feedback that distracts from other responsibilities.

To achieve these and other objectives, the embodiments herein comprise a software application running on a touch-sensitive device, e.g. a mobile device, wearable tech material or other Internet-of-Things (IoT) manifestation (although not limited thereto) to provide e.g. user-input (keyboard) operations. This includes but is not limited to virtual reality configurations. For convenient reference, this software application for this input technique may be referred to as a "mobile app", although it may in fact not necessarily be operating on what is considered to be a mobile device as that term is used in 2017 and onward.

As will be discussed in more detail herein, the mobile app comprises code that runs on a mobile computing device and provides for zones (located within e.g. a touch-sensitive surface) that are monitored for movement, applying that movement to a predetermined matrix of potential interpretations of that movement, chart and delivering the resulting feedback as output of keystrokes.

It should also be noted that the embodiments detailed herein, or elements of it could also exist in the physical sense as a mechanical apparatus with a sort of toggle switch for each of the zones. or with simply the physical touch from one person to another using the gestures and zones described in the drawings applied to the surface of one's skin. It should also be noted that the touch device need not always be a touch-screen but may be any surface that registers contact and provides feedback. In fact, the gestures discussed herein could be applied by the user in the air with a system and method registering their position and direction to communicate. In this fashion, the zone-based gestures proposed here could be used in virtual reality with the zones linked to ones fingers rather than a set location.

A scan of for example a user's fingers, by a camera or other detection method could be used to determine input generated by their movement such that subtle or broad gestures can be used for computer control or communications. The observing device might be used to determine the finger with the greatest movement and to ignore inadvertent movement by the other fingers in order to isolate the intended keystroke. The rapid movement of a finger could trigger the recognition engine to output a keystroke, and a slower more deliberate movement could be ignored to insure only the intended action is registered and the user can return to position and begin a new keystroke with another quick stroke. Likewise, the user could flick a finger in the direction of one of the zones up or down in a virtual space to construct keystrokes. This method can provide keystroke construction in the air by moving two fingers in a variety of directions and through the use of virtual reality motion tracking be analyzed for the intended keystroke as detailed in FIG. 4. This could allow someone that is using a phone or mobile device as a screen inserted into a virtual reality mask, the ability to link with external motion tracking system and provide keyboard control plus the ability to adjust, search or control the device without touching it by simply waving fingers in the air generating keystrokes such as a wireless keyboard might provide.

Figure 22:
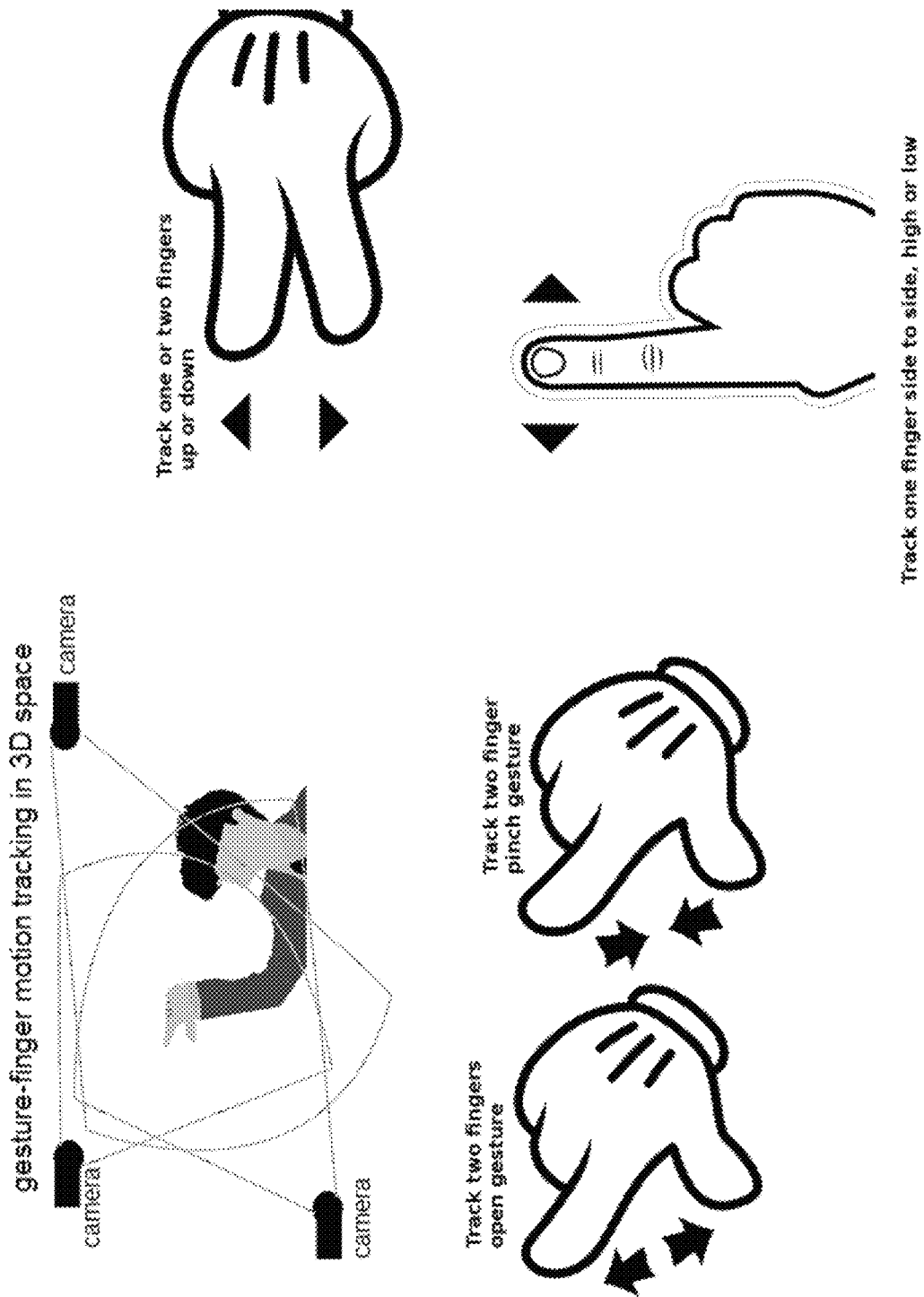
FIG. 22 shows the keyboard used to construct keystrokes in virtual space (no touchpad).

Additionally, as shown at least within FIG. 22, the user could move one or two fingers up and down pointed at four different orientations to provide the keystrokes detailed in this system. Sliding one finger between the orientations would provide the keystrokes described here as moving from zone to zone. A finger moving facing down or a fist moving could also indicate specific gestures. The gestures would be apparent enough to most motion tracking technology to provide a novel way to interact with keyboard control in a virtual environment.

Possible usages of the embodiments disclosed herein include text-input, including input of languages in addition to English, but also other data-input situations in which a prescribed set of finger-movements could be associated with a certain event, but where the user need not divert their eyes from the events taking place. Examples of this could be while operating a machine or vehicle, but also could include score-keeping of an athletic contest such as boxing, mixed martial arts, or basketball, where many different events may occur in a short time but where it is critical to keep proper track of each event. A single finger movement could indicate one kind of foul and have it registered on the spreadsheet by associating the keystroke of each letter produced by this system to 26 different infractions.

Using boxing or mixed martial arts as an example, in the space of 2 or 3 seconds there may occur (by either party) a strike, a block, a kick, where each of these either lands, somewhat lands, does not land, or is blocked (each of which is a separate statistic). There is no way a watcher-observer could type all this in, as their eyes must be focused on the match and not on their computer-screen or other data-input mechanism requiring visual confirmation.

Similarly, extrapolating from a 2-participant contest (e.g. boxing or mixed martial arts) to a 10-person contest such as basketball would require even more eyes-on-event time where the person should not look away from the event for even a short time or risk their statistics being rendered inaccurate. As such, configuring a set of finger-swipes to correspond with the key events in basketball could be advantageous. One of the most commonly overlooked tasks of a basketball statistician is the necessity of keeping track of events "away from the ball", including of course "off-ball" fouls, but also the following: push; shove; trip; elbow; free-throw violation not called by referee; proper detection of impending ball-screen; lack of detection of impending ball-screen; proper detection of impending non-ball-screen; lack of detection of impending non-ball-screen; failing to rotate on D; rotating properly on D. Further, all of these events could be caused by any of 10 different players.

The reasons these may be important is that failing to rotate on D can sometimes be "covered up" or not noticed because of the fact that the other team missed the shot or did not gain any advantage (but the failure was still an error); or, rotating properly on D but where the other team still gets off a good shot (where it may appear that a player got beat on D, but in fact no error occurred). Coaching only on results that clearly occur (e.g. buckets/non-buckets) is not effective, a type of "coaching to the highlight reel only", and only scratches the surface of what is needed. As such, the embodiments disclosed herein could help a coach pick up on mistakes and improvements that may not get noticed in highlight films.

The embodiments herein could be used for alphabet-types of text-entry, in numerous languages, but also could be used for other types of data-entry not involving an alphabet at all. Thus, the expression "keyboard" in this disclosure will also correspond to "symbol-board" or "symbol-table", as many suitable finger-gestures may correspond with data other than traditional keyboard data, and could be used to generate emoticons for example.

Each of the zones is expected to track the direction the initial contact takes within that zone and to provide that information so that a prescribed action may be taken. Contacts moving from zone to zone are also noted and reported to comply with their prescribed action. Not all movement need provide input as determined by the operating instructions loaded into the system. Some movements may provide modifiers such as "Shift" or "Number Lock" (NUM-LOCK) and alter additional keystrokes, rather than generate characters. Additionally, various levels of functionality may be provided to keep input simple, in order to reduce the number of false activations. Specifically, different levels or menus might be unlocked to provide near endless number of keystrokes. For example, a keystroke could open a menu of different options, each option completely changing most of the other keystrokes. Although the intent of this technique is to simplify input, the potential for complexity can also be obtained to secure a wide range of keystrokes and commands that are available to complete a variety of tasks outside mere alphabet usage, e.g. sports scorekeeping, communicating needs for medication, pain levels, and/or other communications from a person with physical disabilities, etc.

In the example of using a touch screen, the initial contact within a zone and the direction of the drag gesture, either towards or away, would be used to determine the intent for the keystroke. Again, some keystrokes may provide a setup or changing the tier for the ensuing keystroke as to generate the preferred input. Additionally, a "poke" without a "drag" may be used to select an item or menu, change a configuration, snap a picture or provide some other action not limited to the text-entry input. It is also possible to use pokes instead of gestures on an upper or lower point of the zones to indicate intent within the designated zones in order to generate some selected keystrokes and this technique may be used as a supplement to the gesture-based systems described herein.

Next, it should be noted that the terms "inner zone" and "outer zone" are not to imply position or proximity, but only to apply label to where the proposed keystrokes may be generated. That is, the expressions "inner" and "outer" are used for convenient reference only. A gesture in any zone may be determined by achieving a certain distance that the gesture travels or it could be as little as when a polarity of activated pixels are measured in one direction and the reduction of pixels activated in the other direction, thus making possible keystrokes that have barely any movement. As such, the area of operation may be as large or small as the user chooses. This choice can be made in an initialization process or can be set to a specific size by a user, according to their preference or physical capabilities. The drawings herein show various examples of zones, but these are examples only. The drawings are illustrative only, so that changes may be made in the specific construction illustrated.

Before explaining the embodiments in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Begin Discussing Figures

Turning now descriptively to the various Figures, in which similar reference characters denote similar elements throughout the several views, the Figures illustrate examples of a touch or motion input device using gestures on defined zones, which comprises a software program (e.g. a mobile app, but also could be some other module) running on a touch-sensitive surface or system able to detect human motion, and to provide data-entry or other symbolic, quasi-alphabet or quasi-symbolic operations. The mobile app runs on a computer device (e.g. a mobile device), but also potentially an "Internet of Things" (IoT) device, or may be organically used from one subject to another, by touching skin or visually observed for examples and provides for zones that are monitored for movement, applying that movement to a prescribed chart of actions or a customization, and delivering the resulting feedback as keystrokes or commands.

Figure 1:
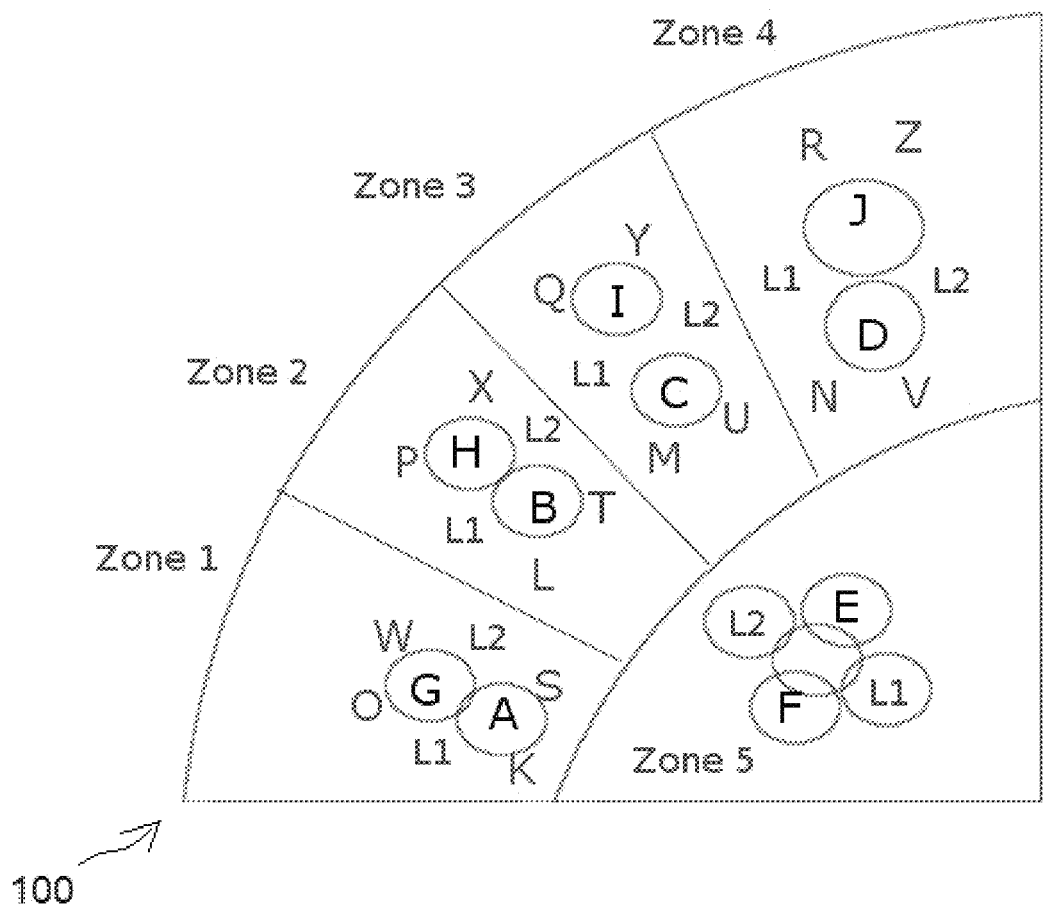
FIG. 1 shows five zones including four outer zones and one inner zone.

FIG. 1 displays an embodiment 100 comprising five zones including four outer zones and one inner zone. Although the location of the letters, symbols or numbers may vary from the preferred model to address usage rates of other preference, these designs are provided to maintain similarity. The letters a, b, c, d, g, h, i, j are in the outer zones facing the direction that the gesture would move if the initial contact was between the letters so "a" would be produced if the gesture moves backward or "g" if it moves forward. Letters e and f are provided in the inner zone when the gesture moves in a perpendicular direction. The second tier of letters shown in red, k, l, m, n, o, p, q, r, are accessed when the inner zone gesture moves in the backward direction (−) direction prior to or in conjunction with a movement or gesture in an outer zone or at the same time as a gesture in both zones. The letters s, t, u, v, w, x, y, z is provided when a gesture in the inner zone goes to the forward (+) direction prior to or in conjunction with a gesture in the outer zones or at the same time as a gesture in both zones. A gesture held in a forward or back (or if desired side to side) position can be used to modify ensuing keystrokes.

Figure 2:
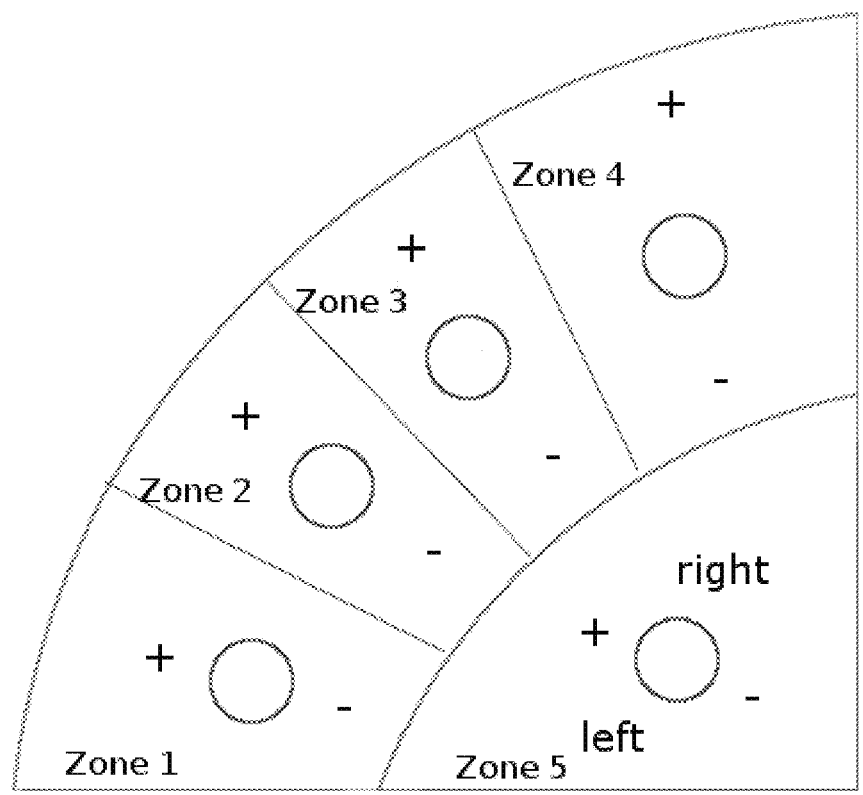
FIG. 2 shows the respective zones of FIG. 1.

Within FIG. 2, zones 1 through 4 are examples of outer zones, while zone 5 is an inner zone. However, as stated, the terms inner and outer are used for convenient reference only, so that the embodiments herein should not be considered as limited by this usage. Each zone has an area of effect that can be wide enough to border the other zones, but can also be dialed down to a smaller area to improve differentiation or as preference dictates. The gesture moving in the forward direction is noted with a + and the gesture moving in the direction of the backward direction is shown as − (for more illustration of potential keystrokes, see also FIG. 4).

Figure 12:
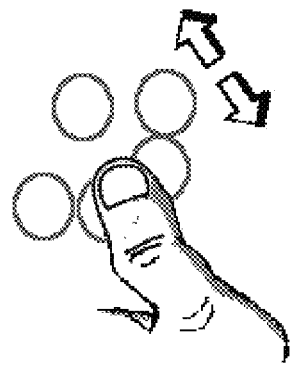
FIG. 12 shows zones reversed in an alternate configuration with 4 inner zones and one outer zone.
Figure 12:
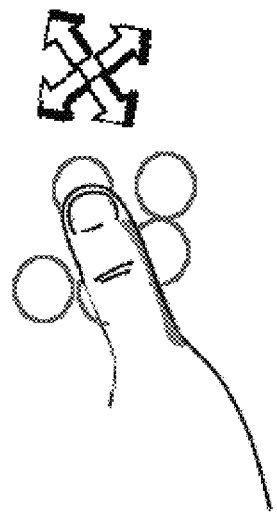
Figure 12:
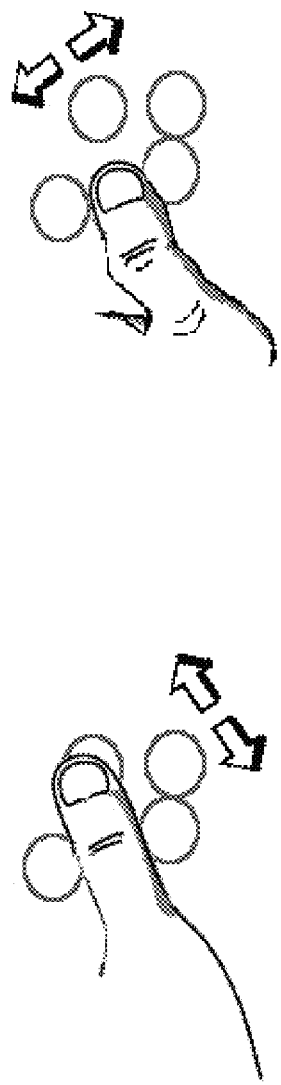

It must also be noted that the embodiments herein could be flipped to make the four outer zones into inner zones and the inner zone to an outer zone, an example of which is shown in FIG. 12. Such variances are expected to customize for a preferred experience using this zone movement technology. Inner zone keystrokes can also use up and down directions for producing letters and left and right movement for modifying the keystrokes in the outer zone.

Figure 3:
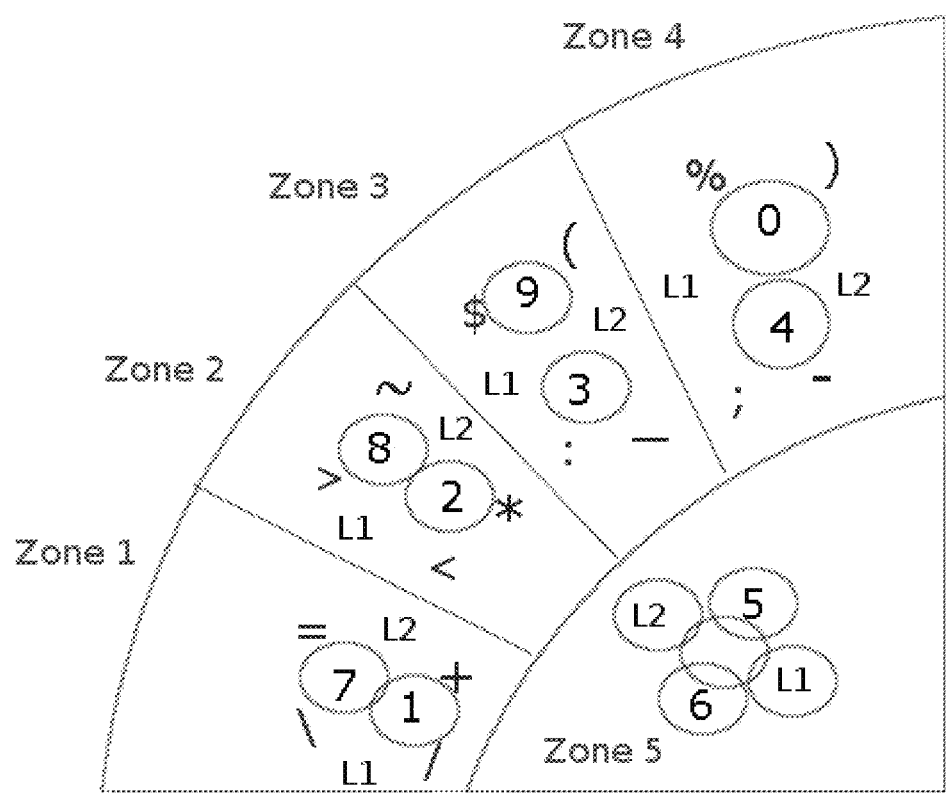
FIG. 3 shows depiction of keystrokes provided if a device is in "number-lock" (NUM-LOCK) mode.

FIG. 3 is a depiction of the keystrokes provided if the device is in number lock mode, using the same utility as described in FIG. 1. Within FIGS. 1 and 3, among others, a touch-swipe-gesture towards L1 provides a first level shift, and a touch-swipe-gesture towards L2 provides a 2nd level shift.

FIG. 4 shows a preferred configuration of the keystrokes and how they are provided. The key to understanding FIG. 4 is shown in FIG. 2 which documents the terms used in the spreadsheet. Specifically, FIG. 4 shows an example gesture table which is based on a 5-point keyboard where (−) corresponds to a direction of touch-swipe-gesture as shown in, for example, the (−) in FIG. 2, and (+) corresponds to a direction of touch-swipe-gesture of the (+) again within e.g. FIG. 2. Additionally, underscore (_) indicates a drag from one position to other(s).

However, it is to be noted that alterations and additions to what is shown in FIG. 4 are expected as per the wants and needs of the user or the specific application for an input device, or by changing modes to incorporate emoticons or special characters, and include different alphabets for foreign markets.

Figure 5:
FIG. 5 shows a depiction of the keyboard on a smart watch with the letters in white for single direction gestures or red and blue for an initial or in conjunction with a red or blue (− or +) direction gesture.

FIG. 5 is a depiction of an embodiment 500 shown on a smart watch with the letters in white for single direction gestures, or red and blue for an initial or in conjunction with a red or blue direction gesture.

Figure 6:
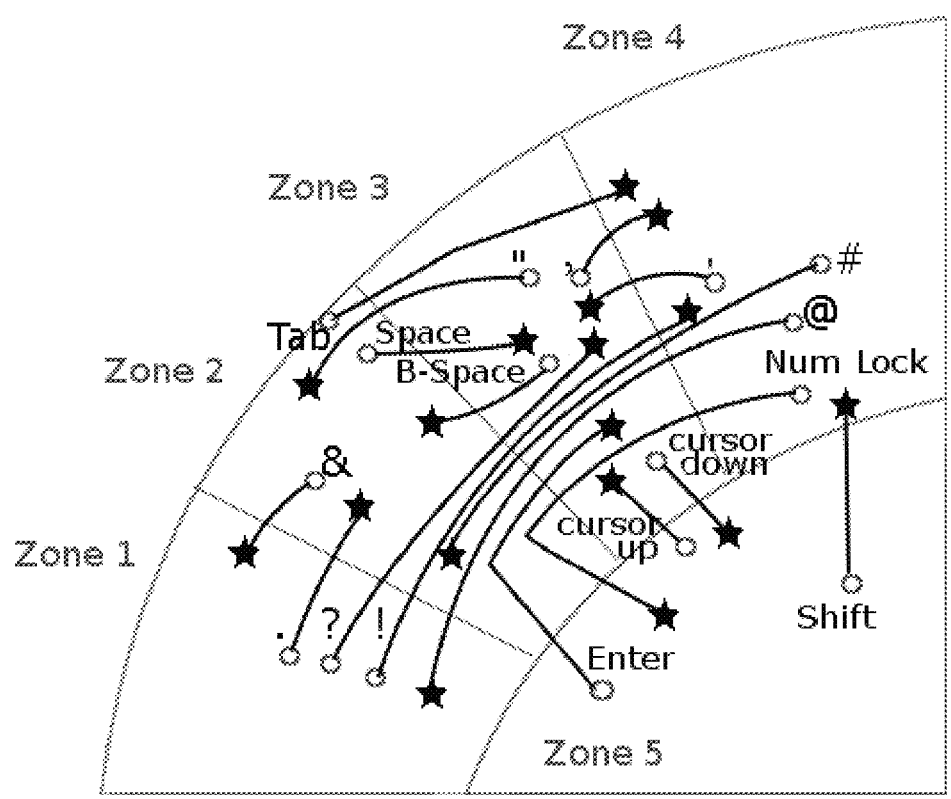
FIG. 6 shows a depiction of the keystrokes provided when movement occurs through multiple zones.

FIG. 6 is a depiction of the keystrokes provided when movement occurs zone to zone or through multiple zones. The circle near the symbol at one end of the line shows the start of the gesture moving to completion at the end of the line with a star.

Figure 7:
FIG. 7 shows a depiction of the finger travel using a preferred method over one or more defined zones.
Figure 7:
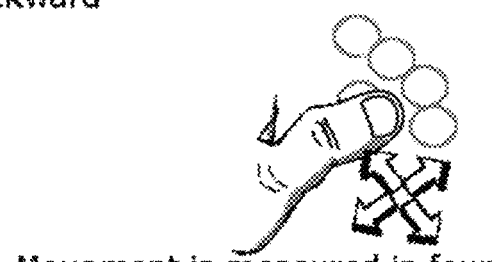
Figure 7:
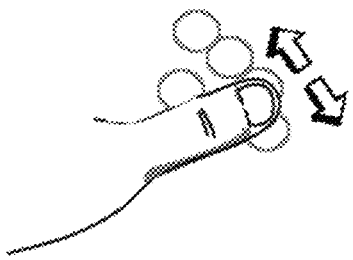
Figure 7:
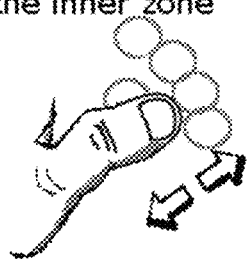

FIG. 7 is a depiction of the finger travel using an example method over a plurality of defined zones. As shown in FIG. 7, the other four zones mainly track up and down but also track when a finger drags from one zone to another. Input is produced when the software detects movement in the zones as detailed in the attached drawings. When a finger gestures or moves outward or backward in one of the four outer arc zones, a keystroke or other symbol-entry is produced. When a finger moves left or right in the center zone, a keystroke is produced. But when a finger moves outward or backward in the center zone, it sets up the outer zones to provide different keystrokes when movement occurs in their zone (this can be set to occur within, or for, a predetermined period of time).

Figure 8:
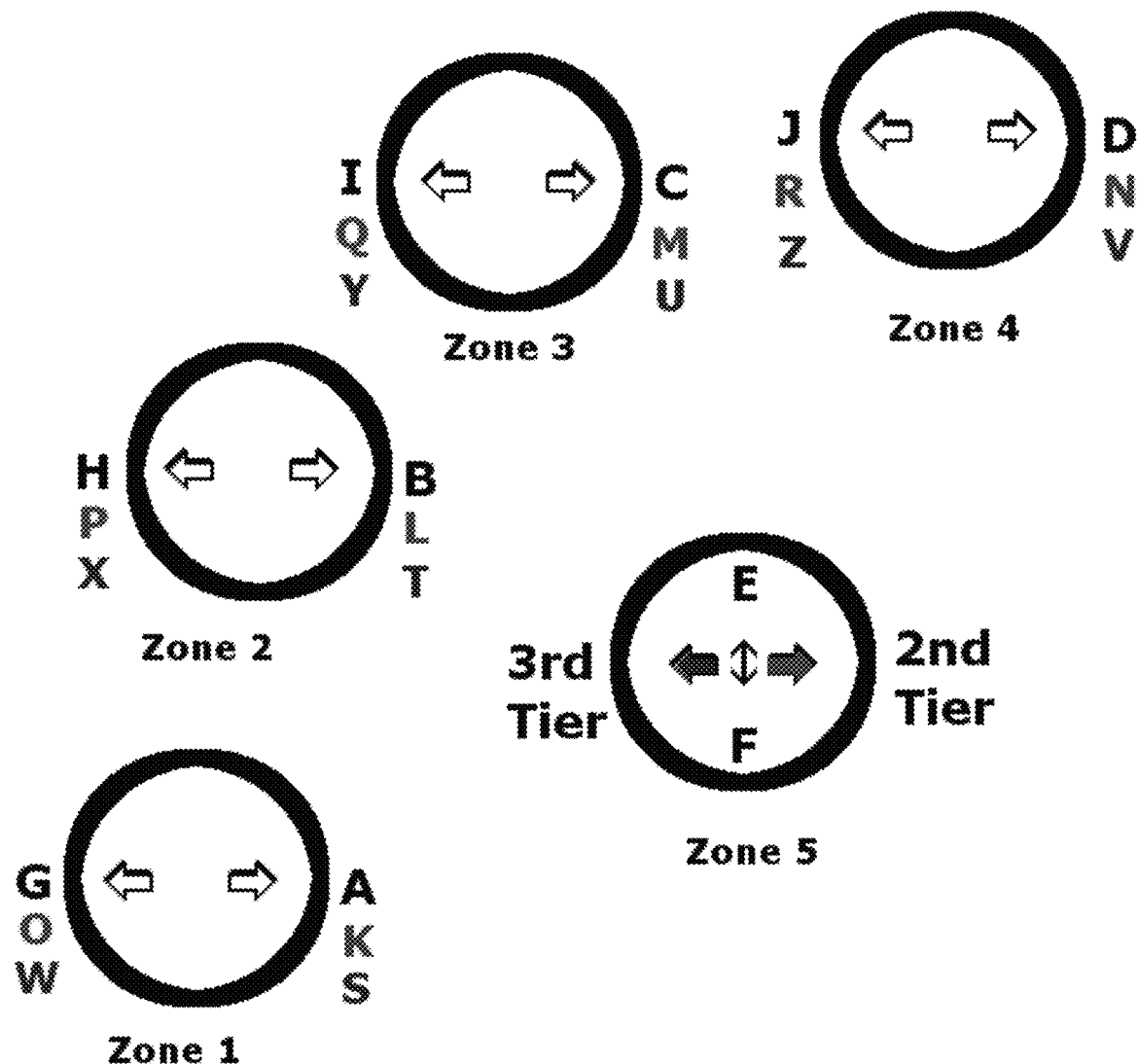
FIG. 8 shows a depiction of utilizing basic gestures in the outer zones and more complex gestures on an inner zone.

FIG. 8 shows an embodiment utilizing basic gestures in the outer zones and more complex gestures on the more convenient inner zone in order, to provide a 26 letter alphabet. Ten letters are produced with a single gesture either forward or backward in one of five zones. A (−) stroke in zone five leads to the formation of the second tier keystrokes, K through R in the outer zones and a (+) keystroke in zone five leads to the formation of the keystrokes S through Z in the outer zone. As with other embodiments shown herein, it is expected that customization will allow for varying nomenclatures from the exact method shown in FIG. 8. The embodiment of FIG. 8 shows zones 1-4 can measure movement bilaterally for producing keystrokes, while zone 5 can be used to measure movement quadratically for generating keystrokes or accessing 2nd or 3rd tier keystrokes. Further, movement can also be measured between zones, thereby generating additional keystrokes.

Figure 19:
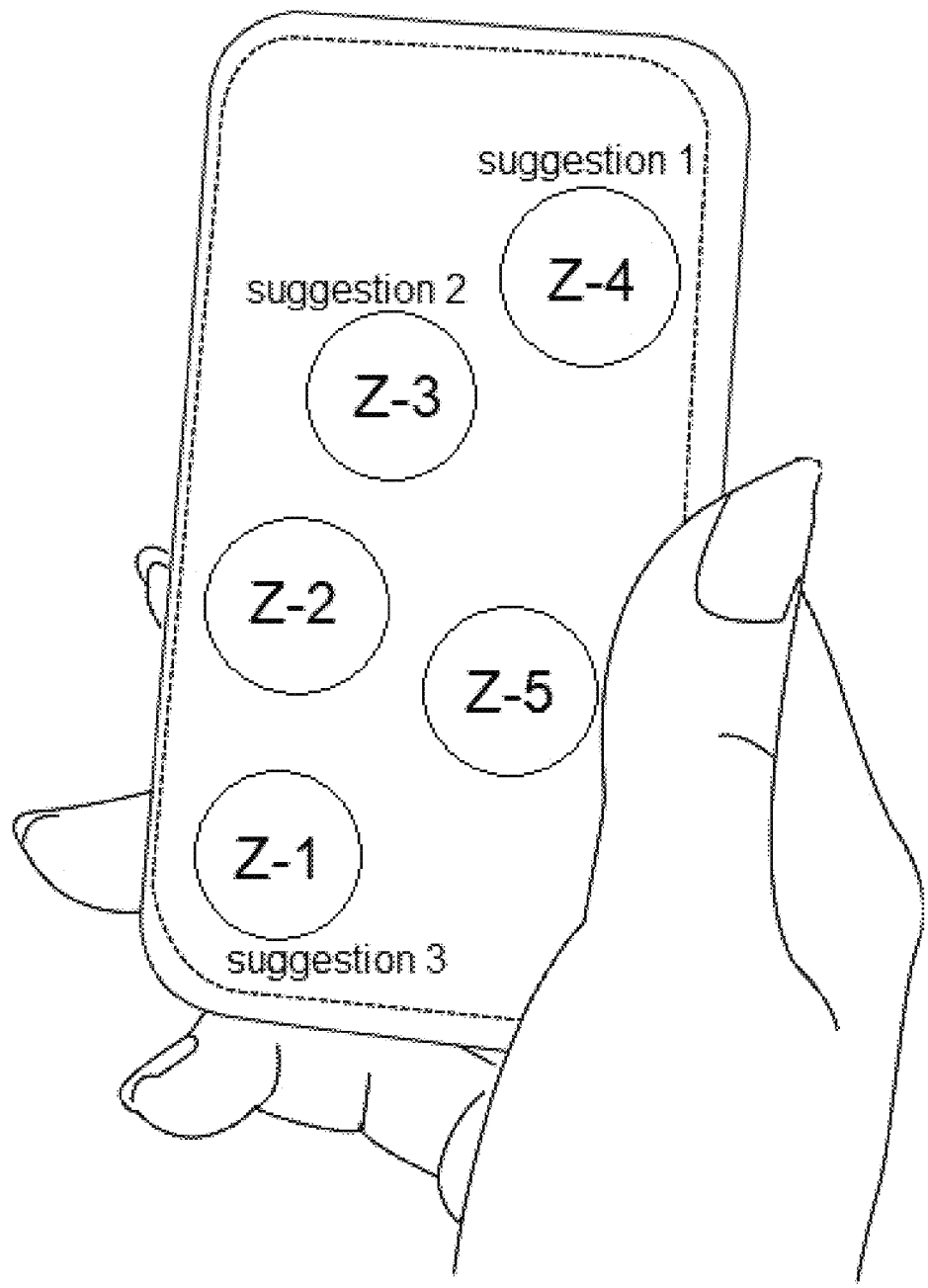
FIG. 19 is a depiction of how the technology may be deployed on an example mobile device.

In the example embodiment shown in FIG. 8, five zones 1, 2, 3, 4, and 5 are located near the bottom side of a touch sensitive device within the radius on the user's thumb. As shown in FIG. 19, four zones are located along the thumbs' arc and one zone is located within the arc. This is to allow a user to hold a device with their other fingers in their hand while allowing the thumb of that hand to move within the zones. The center zone tracks in four directions, left, right, up, & down as shown in FIG. 8 (other terms such as forward or backward, side to side, − or + are also acceptable terms).

Figure 9:
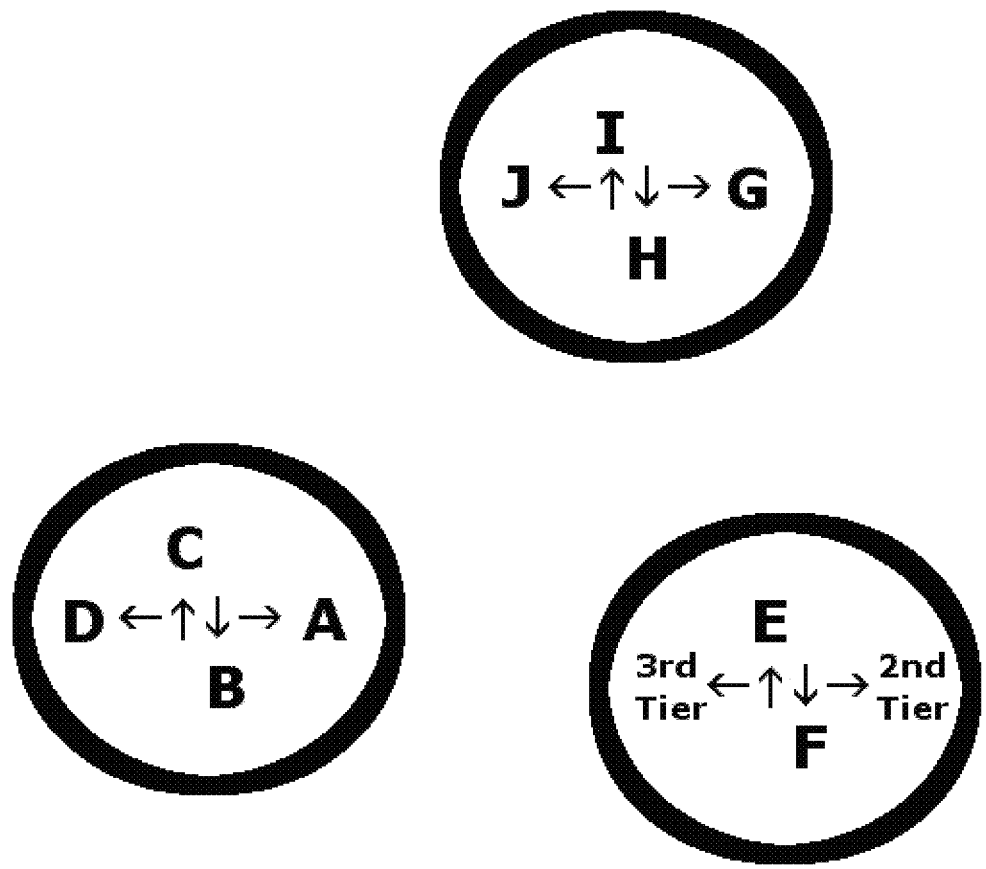
FIG. 9 shows an alternative configuration of the configuration of FIG. 8.

FIG. 9 is an alternative configuration of this method using three zones that interpret gestures in four directions within each zone, that is, measuring movement in each zone quadratically.

Figure 10:
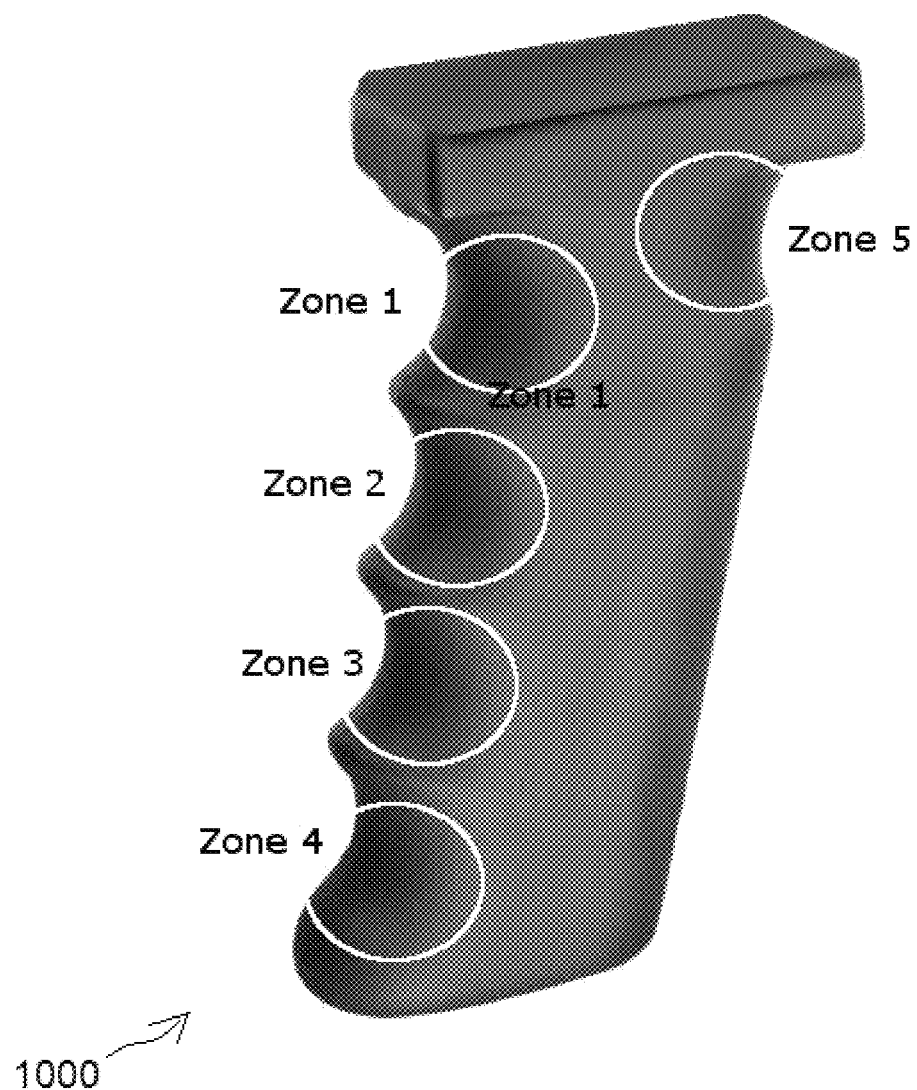
FIG. 10 shows how zones may be arranged on a grip such that keystrokes may be provided in convenient finger-falls within a variety of surface constructions.

FIG. 10 shows an embodiment in which various zones may be arranged on a grip 1000 such that keystrokes may be provided in convenient finger-falls within a variety of surface constructions. In the example of FIG. 10 where the embodiments herein are deployed into a hand grip, or a bicycle grip, shift knob, gun grip or other, the user may want the embodiments dormant while using the grip or surface for mechanical purposes, and activated only after initiating a command to provide input. It is anticipated that movement that occurs within two zones by the same press may be analyzed to react to only the area more dominantly pressed to better predict the user's intent. This is not to say that predictive text analysis may also be used to help determine the intent of the user, and provide short cuts to data completion. This analysis is described in more detail with respect to FIGS. 29-30.

Figure 11:
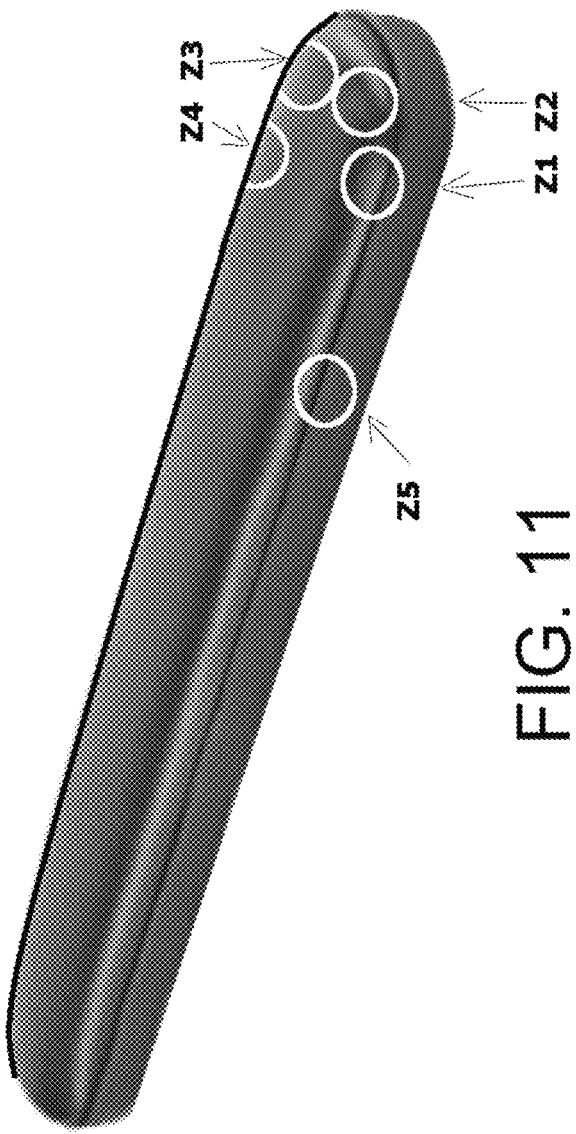
FIG. 11 shows a possible embodiment located on the end of an arm rest.

FIG. 11 shows one possible embodiment 1100 of a keyboard method employed on the end of an armrest, to be convenient to one's finger position and provide keystrokes with minimum movement. The input uses one or more active fingers.

FIG. 12 shows zones reversed into an alternate configuration comprising 4 inner zones and 1 outer zone. In FIG. 12, within a (single) outer zone, movement can be measured in 4 directions, while within the (multiple) inner zones, movement can be measured from the initial press to forward or backward. Further, movement can also be measured between zones.

FIG. 13 shows an embodiment 1300 of an interface inside a user's mouth with the tongue providing the gestures to allow greater independence and control for the severally disabled. The embodiment 1300 shows a tongue-operated keyboard to be located within a user's mouth, as a type of upper palate appliance, and can be used by e.g. a quadriplegic, or someone who has zero or limited use of their arms or legs or fingers, a touch sensitive surface could be applied to the roof of their mouth with a sort of denture The sensitive surface may have leads or wires to transmit the data outside of the mouth, or the transmission could be wireless. The surface would consist of an inner zone near the back of the mouth and an outer zone in the front of the mouth near the teeth.

The inner zone would have one touch sensitive area that can detect whether the tongue touching it is moving left or right or forward and backward. Meanwhile, the outer zone will comprise of four touch areas that can detect movement forward and backward in each zone, or movement between zones. Each zone senses the direction that the tongue makes following contact to determine the desired result. The lifting of the tongue would conclude the keystroke in the outer zones, or if the movement is left or right in the inner zone. Movement forward or backward in the inner zone would be interpreted as a sort of shift command to be applied with an ensuing tongue movement(s). The user may void the shift command by repeating the same forward or backward movement in the inner zone prior to making any other contact with the touch sensitive surface in the outer zone. The area required to be touch sensitive would be the point from the inner zone to each of the four outer zones, and an area connecting each of the four outer zones.

Figure 14:
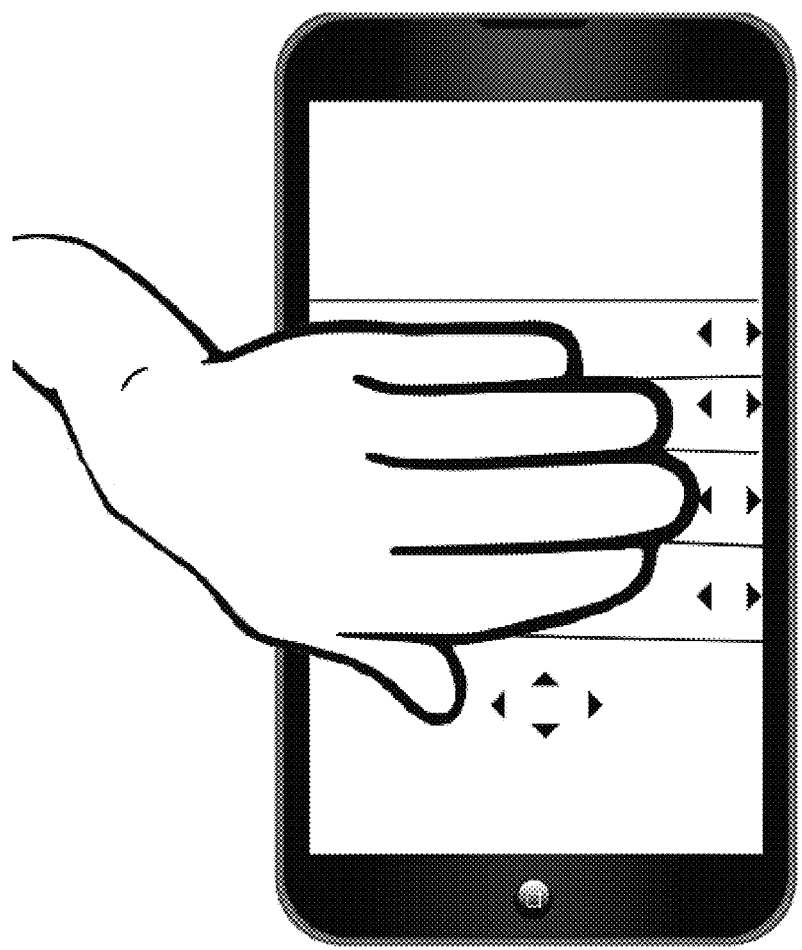
FIG. 14 shows five parallel zones.

Although there are a number of technologies that may be used to provide touch input, such as capacitive, resistive, mutual capacitive, etc. the embodiments of FIGS. 13-14 should not require much pressure against the touch sensitive surface by the tongue, but rather would detect movement by measuring the electrical signal changes to a local electrostatic field on the surface of the device in contact with the tongue. Alternatively, the in-mouth interface could comprise physical levers that can be pushed one way or another by the tongue. These levers could be a substitute for the gestures described in this application and act as switches for making contact. Some current mouth interface systems require the tongue to be pierced and embedded with a sensor.

Although not required to operate effectively with the embodiments herein, all of the elements of the system could be removed like a denture whenever desired or for cleaning, comfort and maintenance. This technique and proposed device could allow individuals that lack the ability to move or speak but are able to operate their tongue, the ability to communicate and control systems that may promote greater independence.

FIG. 14 shows an embodiment 1400 having five parallel zones and how the system may be applied in this matter. Another implementation of the system could utilize five parallel zones such that the fingers of one hand can lay comfortably on them. As shown in FIG. 14. the forefingers' gestures would still be forward or backward, but the thumb gesture would either be forward\backward OR side to side, to provide modifiers or generate keystrokes.

Figure 15:
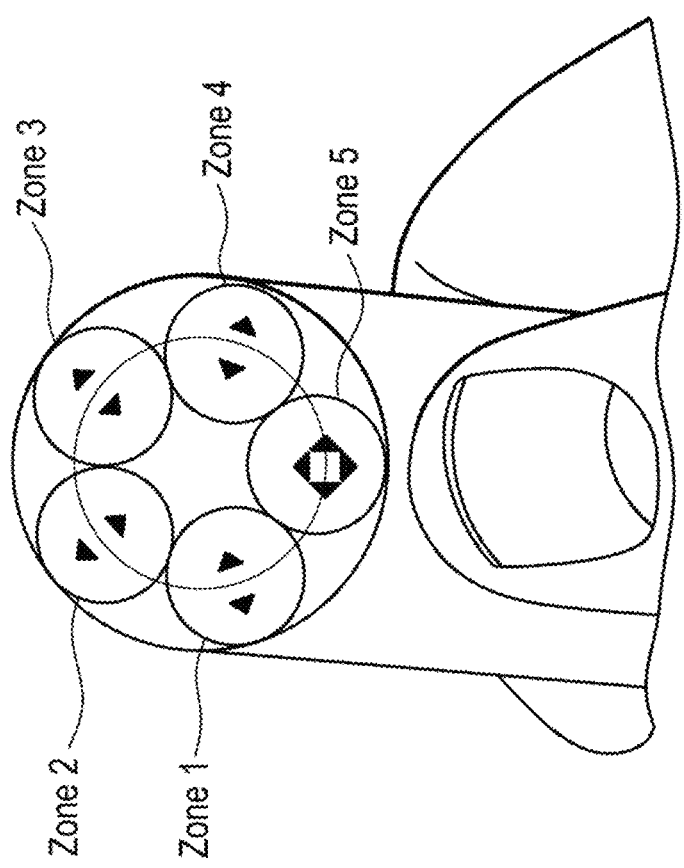
FIG. 15 shows an embodiment applied in a small stone-sized embodiment suitable for single-thumb texting.

FIG. 15 shows a stone-sized embodiment 1500, suitable for single-thumb texting. Another implementation of this technology can be applied to a small "worry stone" sized embodiment that can provide wireless texting capability. The stone-sized embodiment 1500 could be held in the hand, and may use just one finger for text generation or computer interaction without visual contact, as shown in FIG. 15. The finger would provide the $1^{st}$ and $2^{nd}$ shift level keystrokes by first making a move down or up respectively inside the inner zone before making a move up or down in one of the outer zones.

Figure 16:
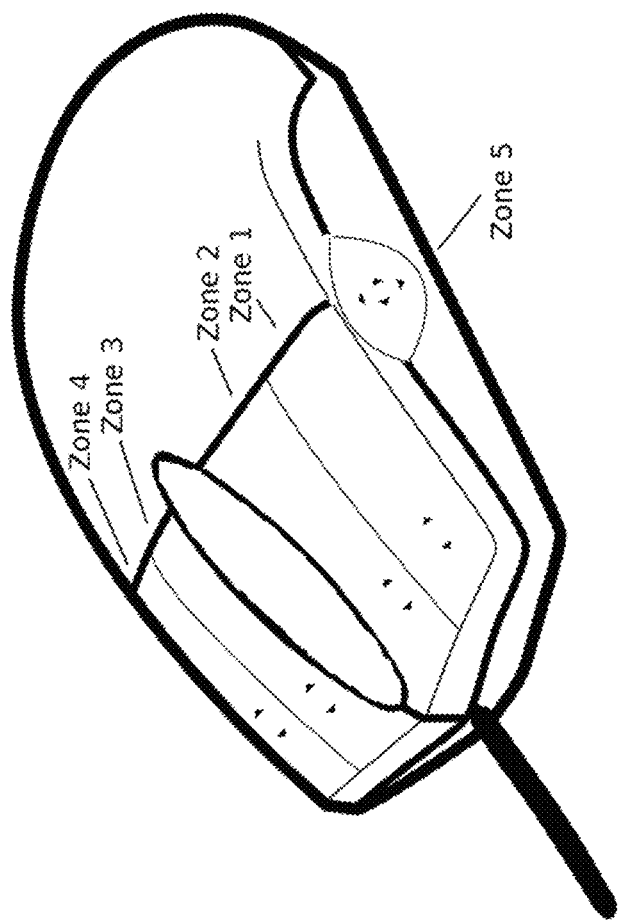
FIG. 16 shows how the system could be deployed onto a typical computer mouse.

FIG. 16 shows an example keyboard-like embodiment 1600 deployed onto a computer mouse. Another implementation of this technology could be provided on the surface of a mouse or other pointing device to provide a convenient method of shifting between mouse and keyboard input without moving a hand. Within the embodiment 1600, the surface of the mouse would have a touch sensitive surface with the five zones described elsewhere in this disclosure as shown in FIG. 16.

Figure 17:
FIG. 17 shows the user customizing the size of the activation zones to initialize the arrangement of a keyboard.

FIG. 17 shows a user self-customizing the size (area) of the activation zones to initialize the arrangement of their preferred keyboard arrangement. The initialization process could occur when the user touches two places to indicate the location of the inner zone and the outer zone. This is important because there can be many differing types of users, finger sizes, body capacitances, and physical disabilities.

Figure 18:
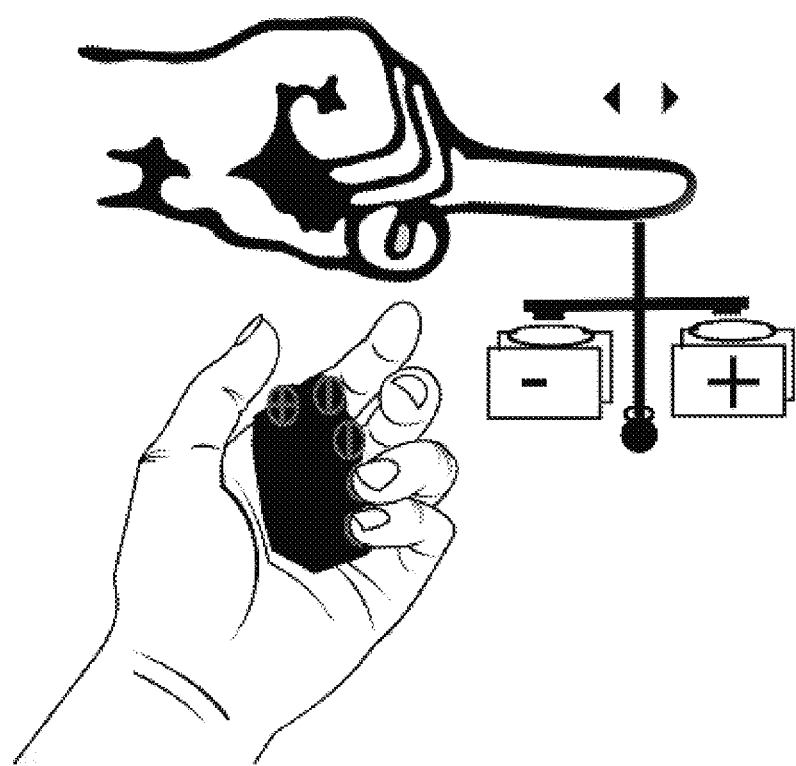
FIG. 18 shows gestures that can be mechanically produced on a non-touch-sensitive structure.

FIG. 18 shows an example where a finger gesture back or forth triggers a switch to make contact on either side. Specifically, FIG. 18 shows how the gesture can be mechanical in nature to use this technology on a non-touch-sensitive structure. In another implementation the method can be applied with mechanical means, and employing the physical action of a finger gesture by using a lever that stretches across two switches such that when the finger moves forward one switch is activated or if the finger is moved back, the other switch is activated. Additional functionality can be applied such that if the finger is pressed, both switches are activated.

FIG. 19 shows how the technology may be deployed on a smart phone and offer word-completion suggestions that can be accessed with a touch or poke. In a preferred implementation on a smartphone, the gestures can be conducted with just a thumb from the same hand holding the device and software generated suggestions could be tapped to select them.

Figure 20:
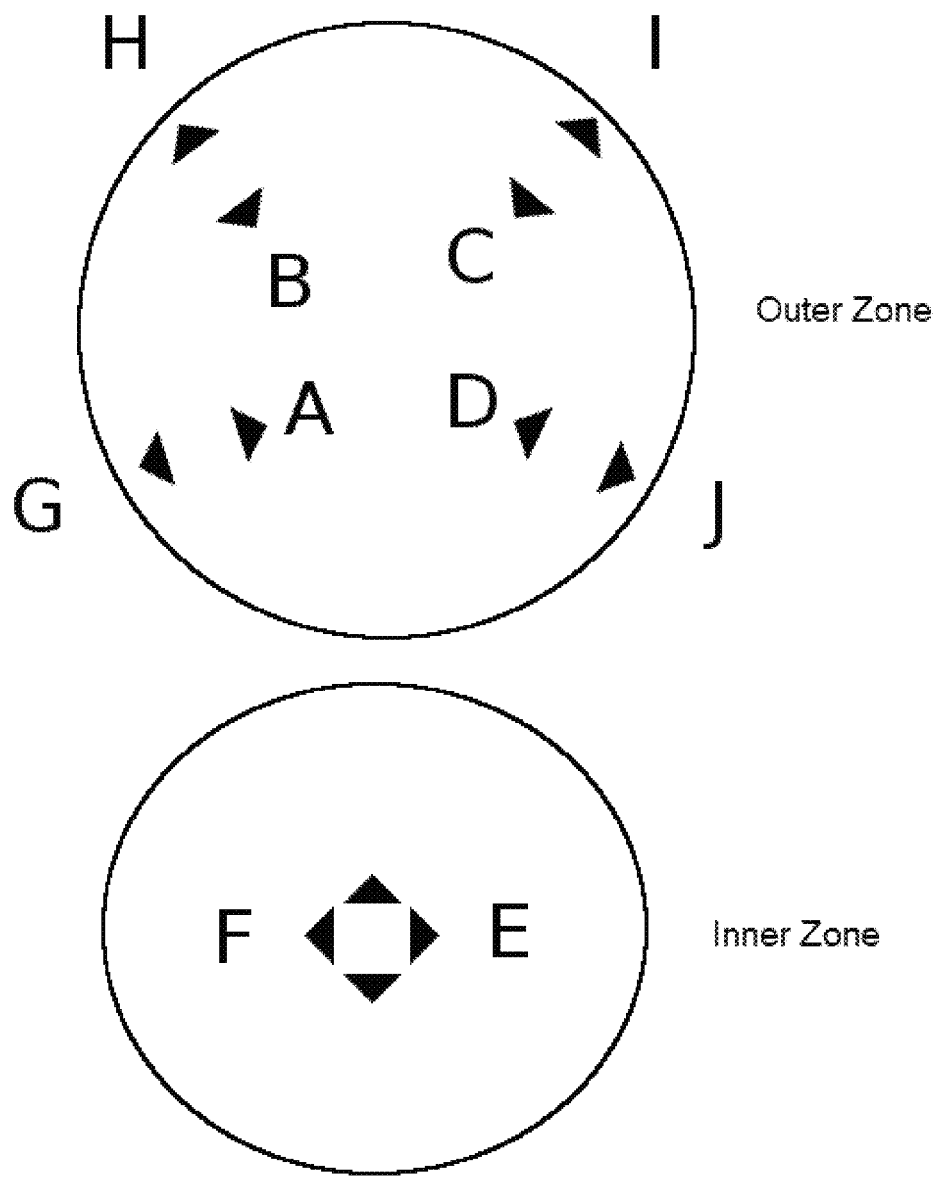
FIG. 20 shows is a depiction of how the outer zone could contain all four outer zones overlapping and use direction of gestures for determining the desired keystroke.

FIG. 20 shows how an example outer zone could contain all four outer zones overlapping and use direction of gestures for determining the desired keystroke. Additionally, the outer zones can function as one large zone, overlapping the inner zone, so that the direction of the gesture will determine the intended keystroke. For example, the gesture from 300° could be A, the gesture from 330° could be B, the gesture from 0° would be shift level 1, the gesture from 30° C., and a gesture from 60° D, the gesture toward 90° E, the gesture toward 270° is F, the gesture toward 300° G, the gesture towards 330° H, the gesture toward the gesture toward 0° would be shift level 2, the gesture toward 30° I, the gesture towards 60° J. In this respect, as shown in FIG. 20, the area of operation can be reduced to two tiny zones and applied into a great number of technologies that could benefit from having specialized user-input capability.

Each of these directions could have a significant error margin of more than 20% in order to improve recognition of a user-gesture. In the case of one small outer zone, the perimeter of the zone can be used to provide gestures that would otherwise be provided by movement from zone to zone. Gestures that occur in the inner zone can still act as modifiers to the gestures performed in the outer zone. It is equally possible to construct a layout for this technique with an outer zone surrounding the inner zone and locating zones up to 90° from each other as in FIG. 24 where the operation of the keying instructions would still be the same. Although gestures are generally counted as complete when the finger is lifted, it is not a prerequisite to operating with the embodiments disclosed herein. A user may move the finger in one direction and return it to a neutral position to register keystroke without ever lifting a finger. A gesture that is held in the inner zone could provide for multiple keystrokes on the same shift level of the keystrokes available in the outer zones. For example, a user slides a finger down or alternatively sideways, in the inner zone and holds it at that shift level 1 position, a slide down in zone 3 provides an "M" character. The user can maintain holding the finger in the shift position of the inner zone and slide a finger up in zone one resulting in a letter "O".

Although gestures are generally counted as complete when the finger is lifted, it is not a prerequisite to operating with the embodiment disclosed herein. A user may move the finger in one direction and return it to a neutral position to register keystroke without ever lifting the finger. Further, a gesture that is held in the inner zone could provide for multiple keystrokes on the same scale or level in the outer zone.

Figure 21:
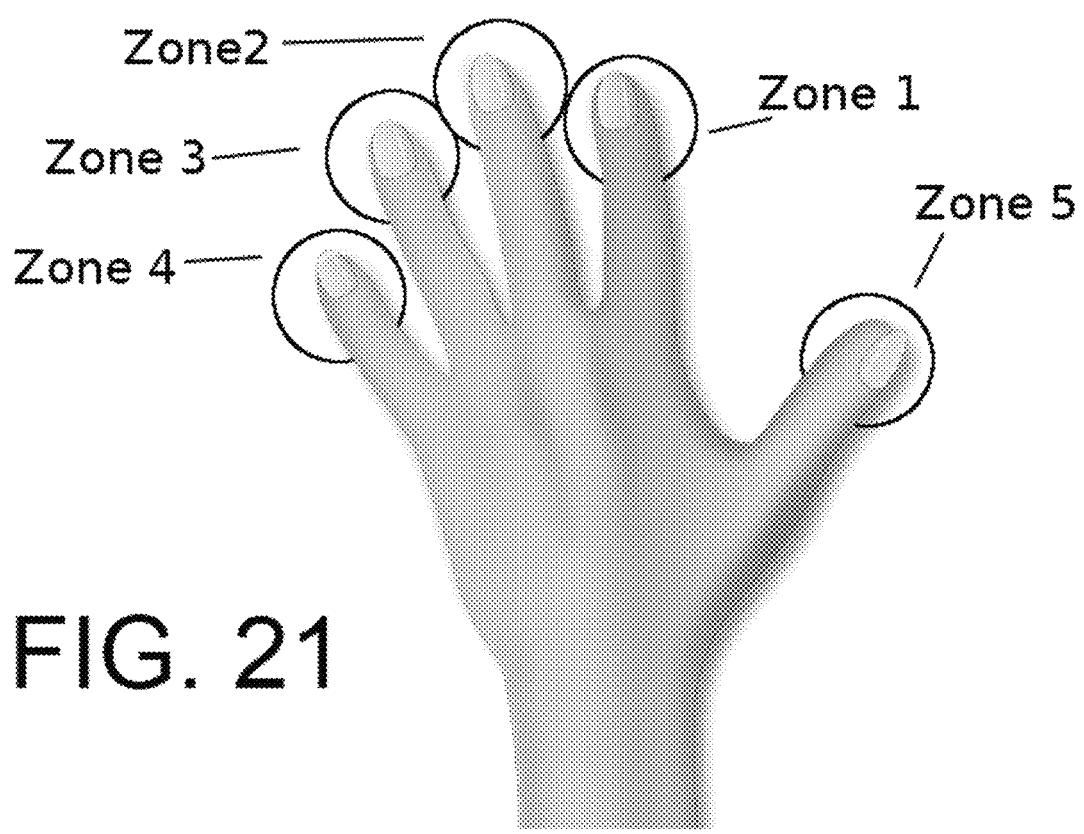
FIG. 21 shows five fingers on one hand with one finger operating inside each zone.

FIG. 21 depicts the use of five fingers on one hand with one finger operating inside each zone. These zones can be reduced to just a tine contact point beneath the fingers that can detect the direction of gestures over it.

FIG. 22 depicts how a user could generate keystrokes in virtual space by moving one or two fingers up or down inside one of four virtual zones. The user would gesture left or right with a finger facing down to provide the inner zone letters ("E" & "F" in this example) or move a finger facing forward or up to make the keystrokes that are provided by going from zone to zone. A fist could be an additional modifier moving through zones.

The embodiments herein also contemplate adding a deeper virtual reality component and making gestures in the air (no touchpad). The observing device (glove or other wearable) might determine the finger with the greatest movement and to ignore inadvertent movement by the other fingers, in order to isolate the intended keystroke. The rapid movement of a finger could trigger the recognition engine to output a keystroke, and a slower more deliberate movement could be ignored to insure only the intended action is registered and the user can return to position and begin a new keystroke with another quick stroke. Likewise, the user could flick a finger in the direction of one of the zones up or down in a virtual space to construct keystrokes.

This method can provide keystroke construction in the air by moving two fingers in a variety of directions and through the use of virtual reality motion tracking be analyzed for the intended keystroke shown in FIG. 4. This could allow someone that is using a phone or mobile device as a screen inserted into a virtual reality mask, the ability to link with external motion tracking system and provide keyboard control plus the ability to adjust, search or control the device without touching it by simply waving fingers in the air generating keystrokes such as a wireless keyboard might provide.

As shown in FIG. 22, the user could move one or two fingers up and down pointed at four different orientations to provide the keystrokes detailed in this virtual, no-touchpad embodiment. Sliding one finger between the orientations would provide the keystrokes described here as moving from zone to zone. The gestures would be apparent enough to most motion tracking technology to provide a novel way to interact with keyboard control in a virtual environment.

Figure 23:
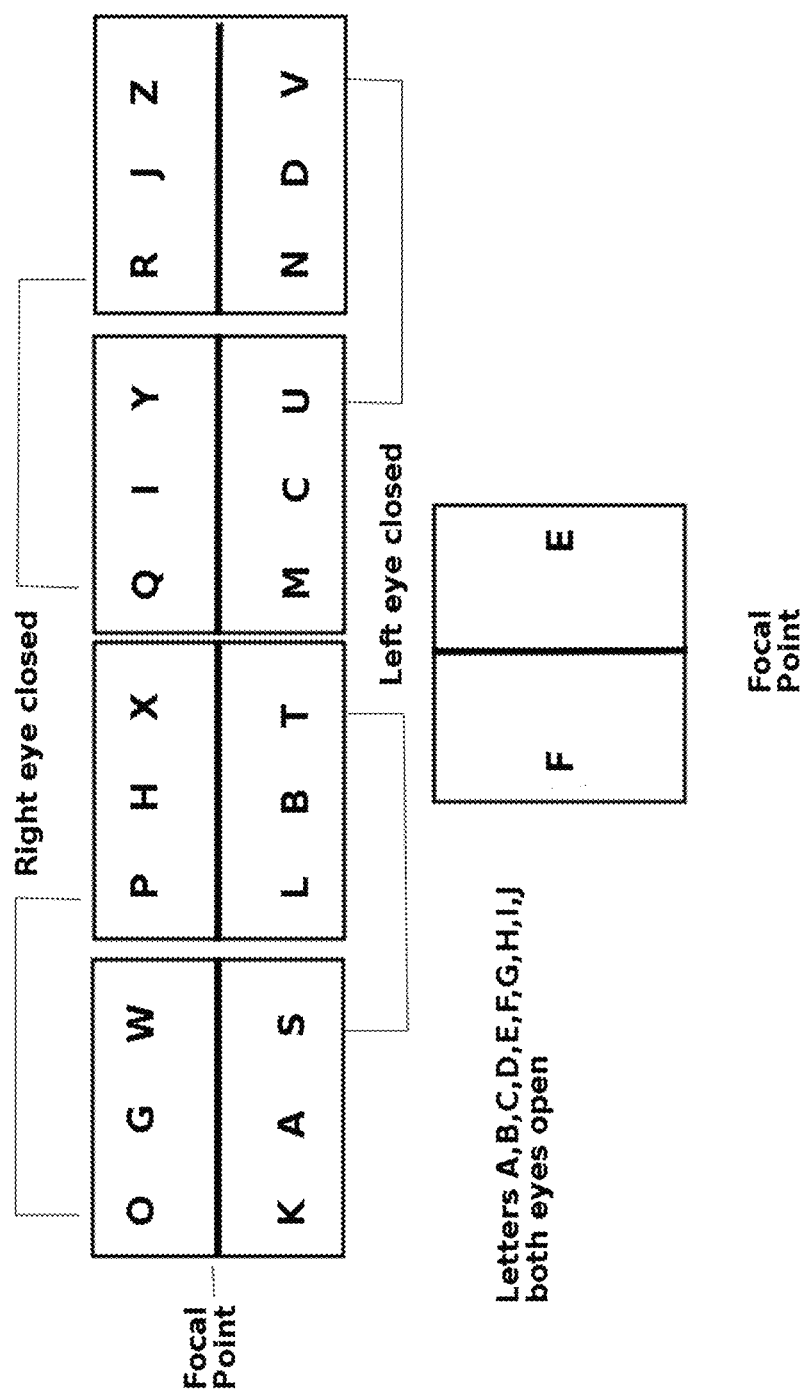
FIG. 23 shows a chart for eye tracking to provide input using hardware suited for eye-tracking.
Figure 28:
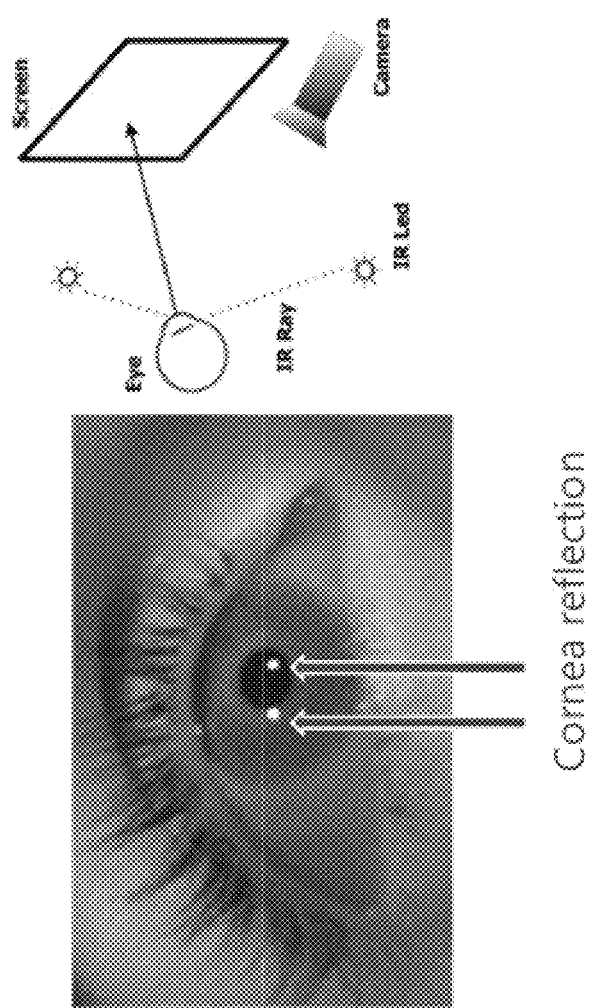
FIG. 28 shows an embodiment of an eye-input device.

FIG. 23 shows how the zones may be displayed for using eye tracking technology to produce keystrokes. Eye tracking or as commonly known as "pupil center corneal reflection" (PCCR), is a method where near-infrared light is directed towards the center of the eyes, at the pupils, causing visible reflections in the cornea (the outer-most optical element of the eye). An example arrangement is shown in FIG. 28. These reflections are tracked by a camera to coordinates that are referenced to the symbol or object located at that location. The four outer zones are shown in blocks above the one inner zone. The user would look at the line between the sets of letters, blink to initiate the keystroke and then glance toward the letter to be selected.

Eye tracking software detects the eye movement and if it is determined that pupil of the eye has stopped for a short pause and is still looking inside that zone, a keystroke is generated according to the action taken. If the eye is detected to leave a zone, it is tracked to its direction and course to another zone and the corresponding keystroke is produced using the prescribed zone to zone keystroke matrix. Closing both eyes for a period could reset an inadvertent blink. If the user is capable of shutting individual eyes, rather than use shifts up or down in the lower inner zone for 16 keystrokes, they can instead keep one eye closed during the initiating blink and eye movement to its landing position. In this case, for reference keeping the right eye closed will provide keystrokes in shift level 1 and the left eye closed would provide keystrokes in shift level 2. For the severely vision impaired, four lights may be implemented to bring the pupil of their eyes to the proper target focal point to begin to compose keystrokes.

Figure 24:
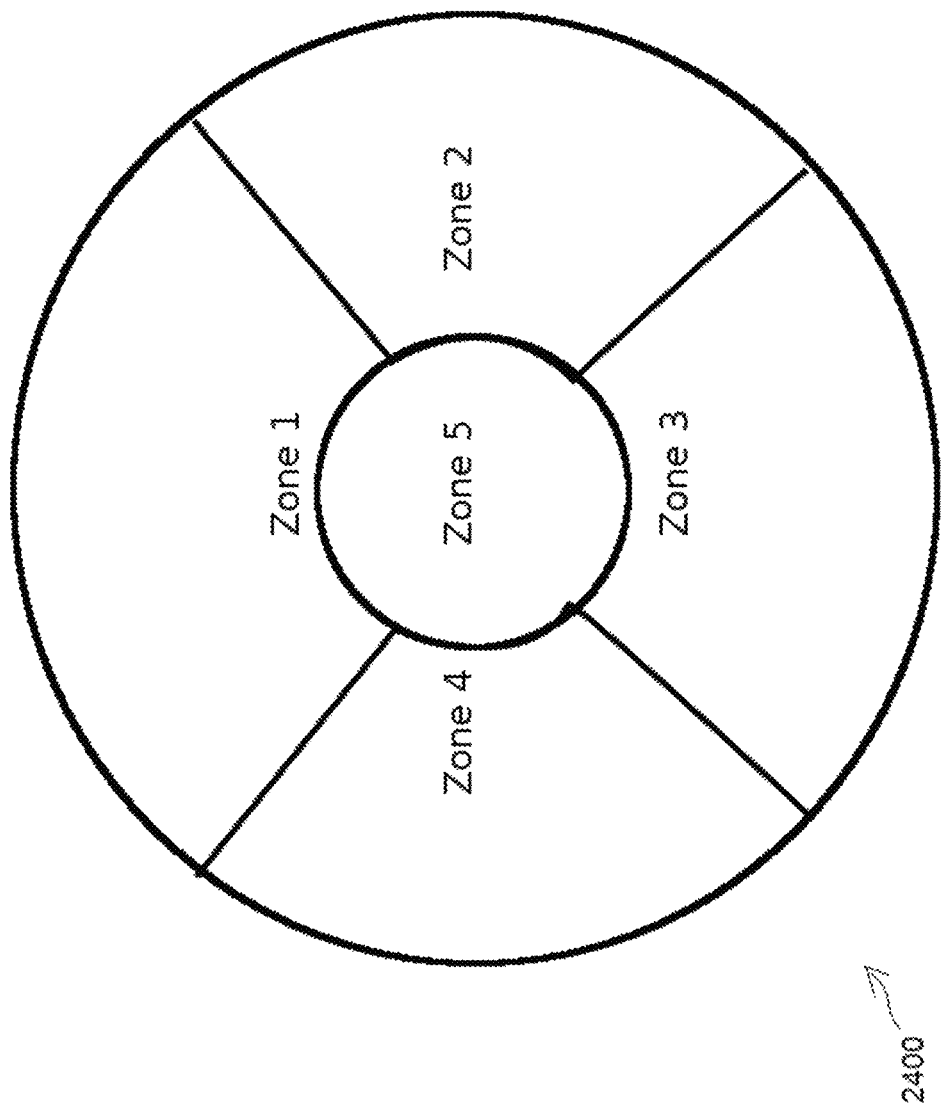
FIG. 24 shows the inner zone can be surrounded but the outer zones.

FIG. 24 shows an embodiment 2400 in which various outer zones can be located around the inner zone. Movement from the inner zone is shown as left and right, up or down and outer zone is displayed along diagonal lines.

Figure 25:
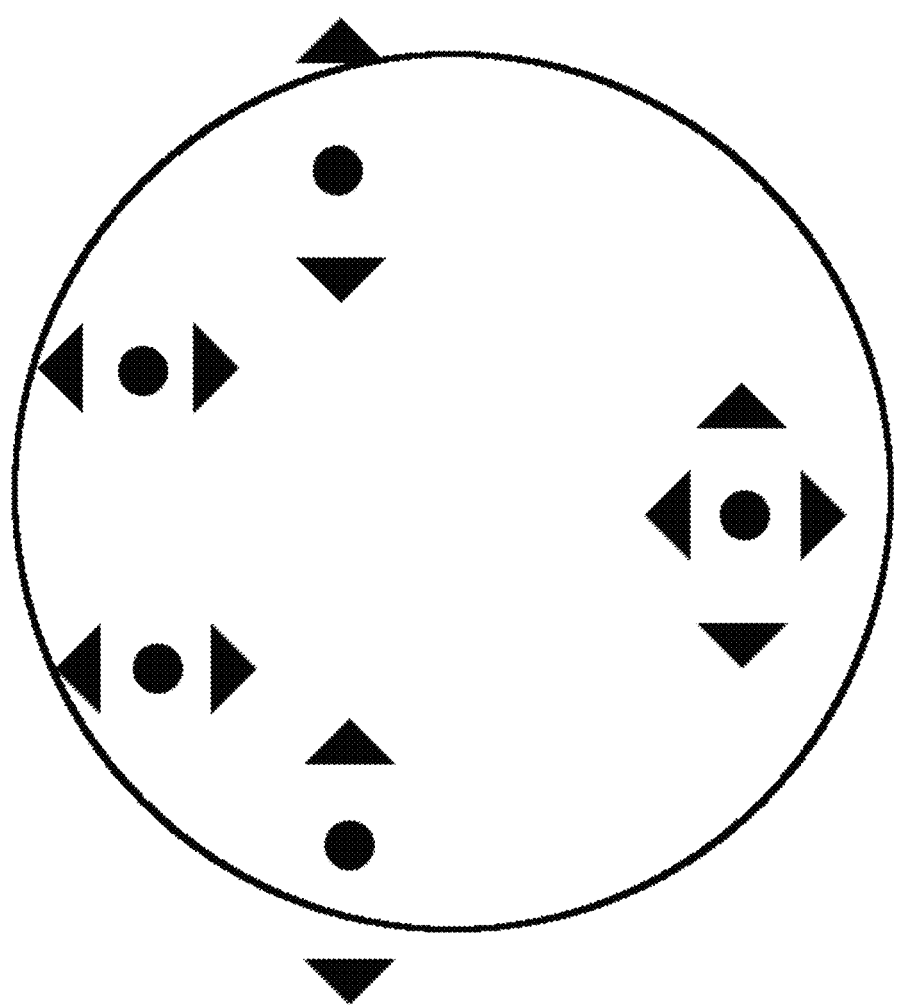
FIG. 25 shows how the interface can be reduced to one zone.

FIG. 25 shows how the embodiments herein can be reduced to one zone by counting gestures into and out of the zone at five specific points along its circumference or proximity thereof. FIG. 25 shows gestures being tracked into and out of zones across contact points, or from one contact point to another contact point.

Figure 26A:
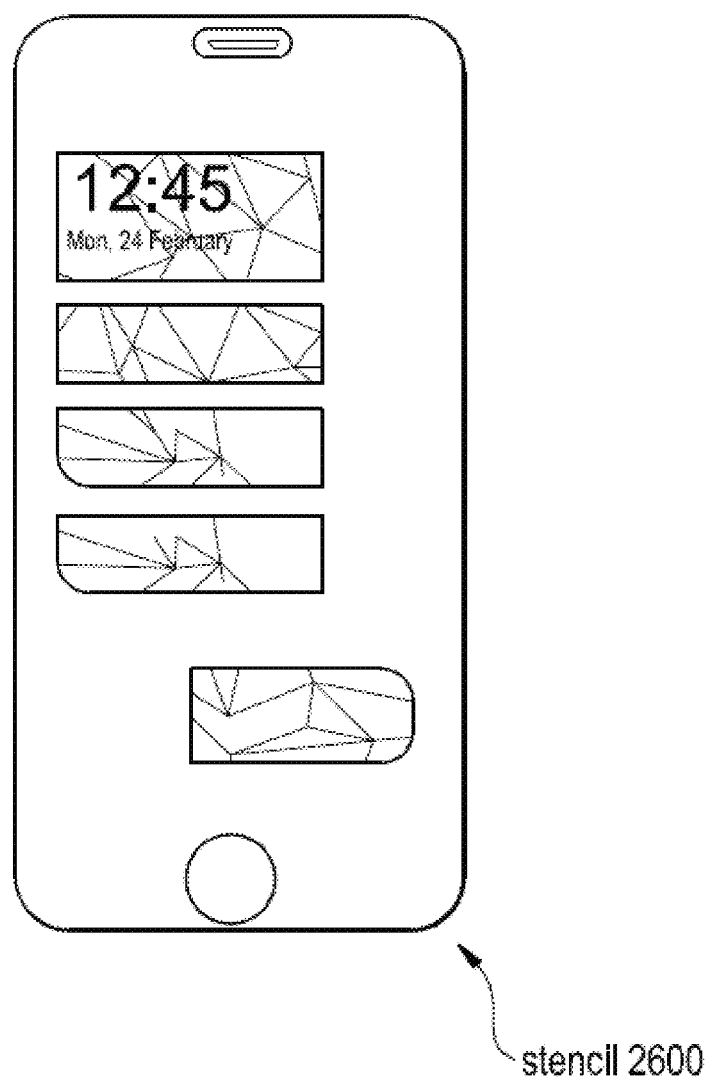
FIGS. 26A, 26B, and 27 show embodiments of a stencil.
Figure 26B:
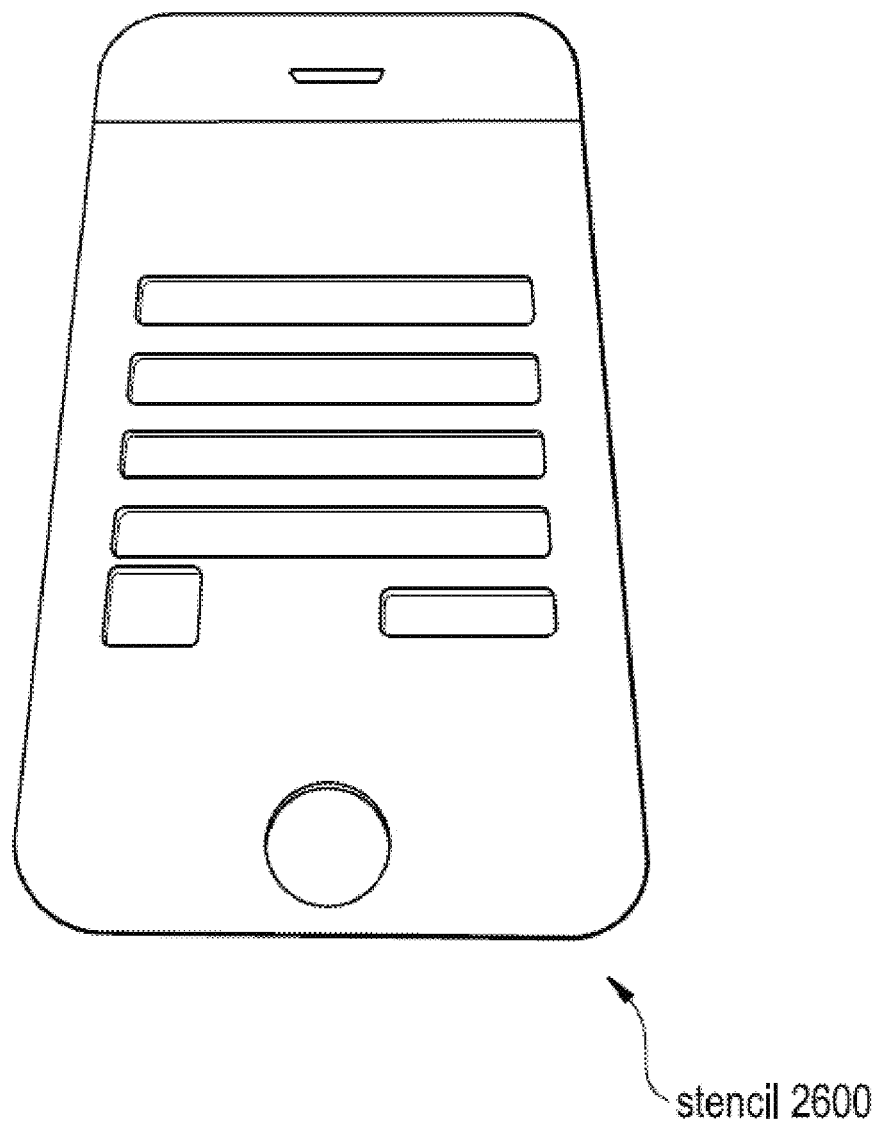
Figure 27:
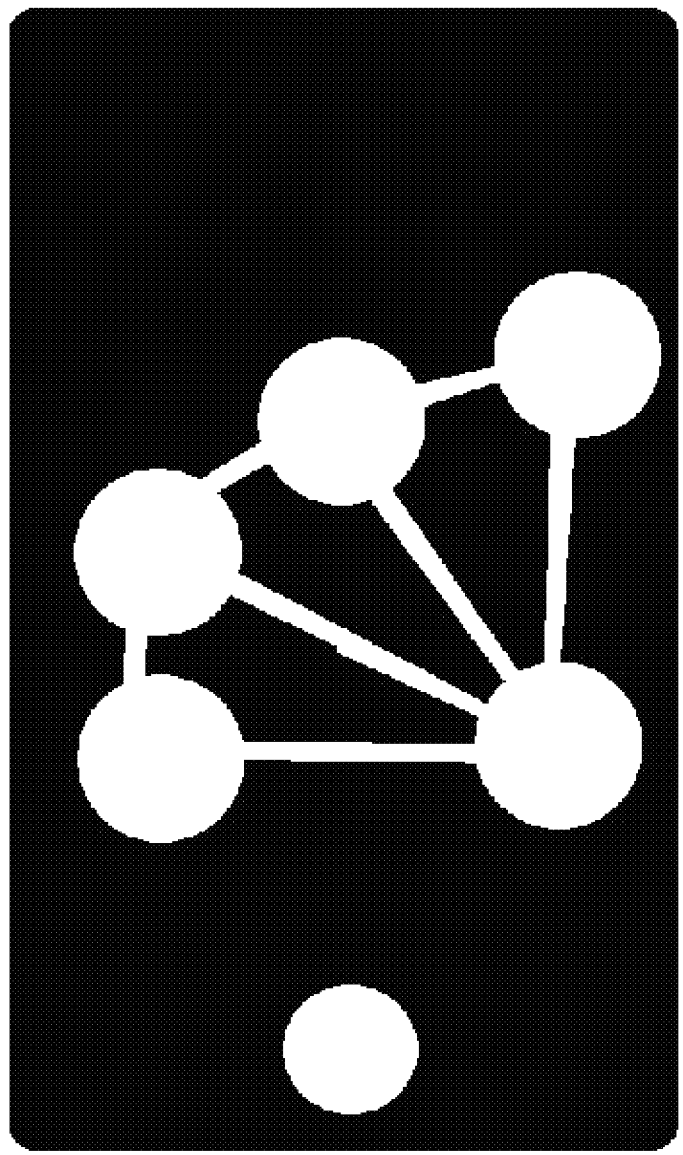

FIGS. 26A, 26B, and 27 show embodiments of a stencil 2600.

FIG. 28 shows an example Prior Art eye-tracking data-input device, which would serve as a foundation or base upon which the embodiments described with reference to e.g. FIG. 23 could be installed. Eye-tracking technology can benefit some with very poor vision from adopting the simple zones and movements embodiments described herein to reduce fatigue and errors associated with more complex layouts and provide even greater assistance to disabled persons with limited muscular control, but still have control over their eyes.

For example, an eye-tracking user could look at a zone for a predetermined period to register contact with eye tracking device, such that a timer might register or change color or some other feature, or a user could just provide a blink when the user wants to register the location to begin the keystroke, and then glance up or down, left or right to trigger the input, thus reducing the range of locations to differentiate from and improving accuracy. The zones can provide the basic keystrokes, "A" through "J" in this example, when both eyes are registered as open within the eye tracking software and trigger the start of the keystroke when either or both eyes blink. The keystroke completes when the user glances up or down within that zone, or left and right in the inner zone, or when their eyes stop on a different zone. The software would than evaluate where the keystroke begins and ends and then use that information to look up the prescribed keystroke or action for that eye movement and send the keystroke as output. First shift level keystrokes, in this example the letters "K" through "R", can be provided when the right is registered to be closed during the blink with the left eye, and the second shift of keystrokes, in this example the letters "S" through the letter "Z", can be provided when the left eye closed is registered and the right eye blinks to begin the keystroke. The user would simply glance to the top or bottom of the zone to complete the keystroke or glance to another zone for other functionality or keystrokes.

This reduction of zones can help people with reduced vision that have trouble identifying individual characters on a screen but could more easily see just five zones or trigger points. Further, this embodiment may be activated or deactivated following a series of eye blinks without glancing in any direction. Eye blinks could also be utilized, for example to choose to a click an item outside the zones, e.g. or to cancel input with the eye closed for a short period. The embodiments include a training and usage module set up to distinguish between necessary blinks not related to the embodiments herein, and blinks for use herein.

Figure 29:
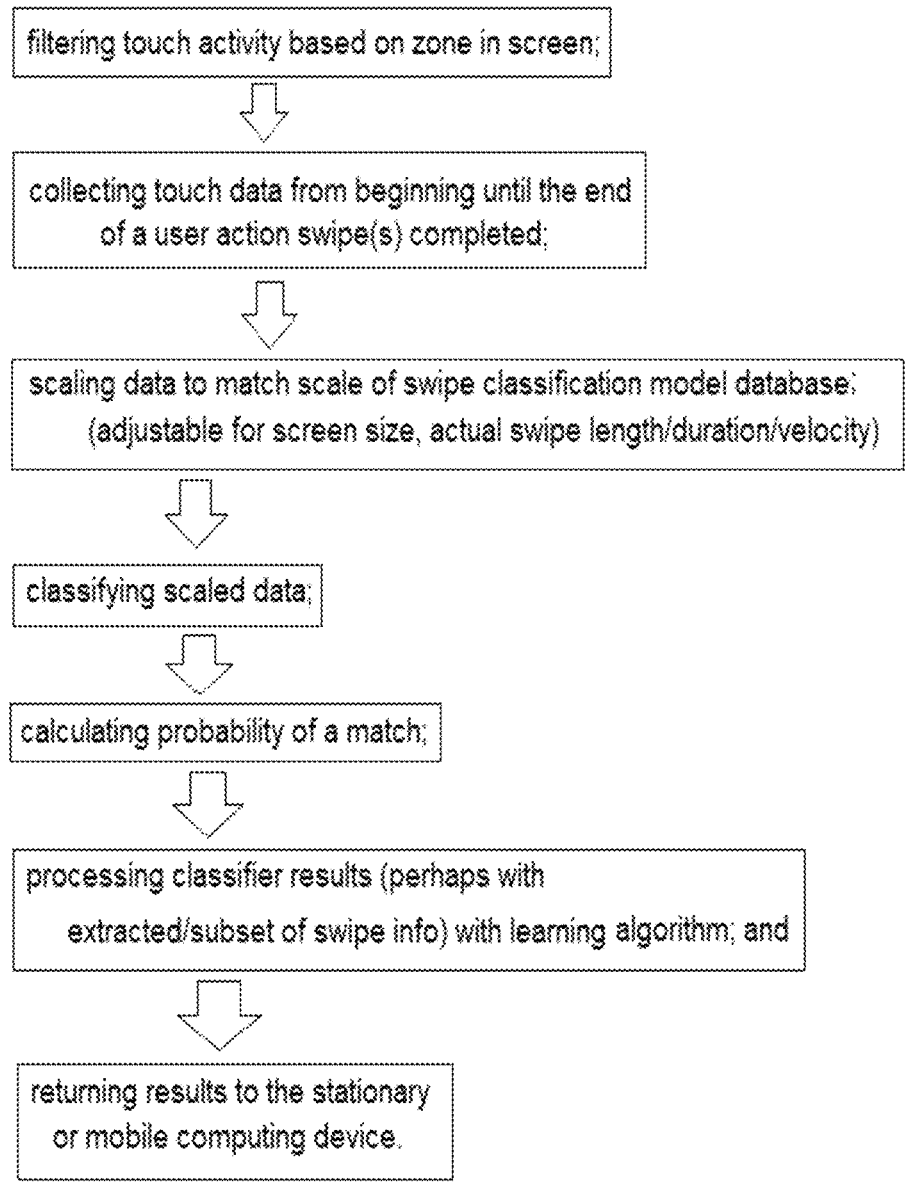
FIG. 29 shows a "swipe training" flowchart.

FIG. 29 shows a "swipe training" flowchart, illustrating one non-limiting potential method by which a human-movement interpretation component 3008 (see FIGS. 30A-30B) populates a valid swipe database 3040.

Figure 30A:
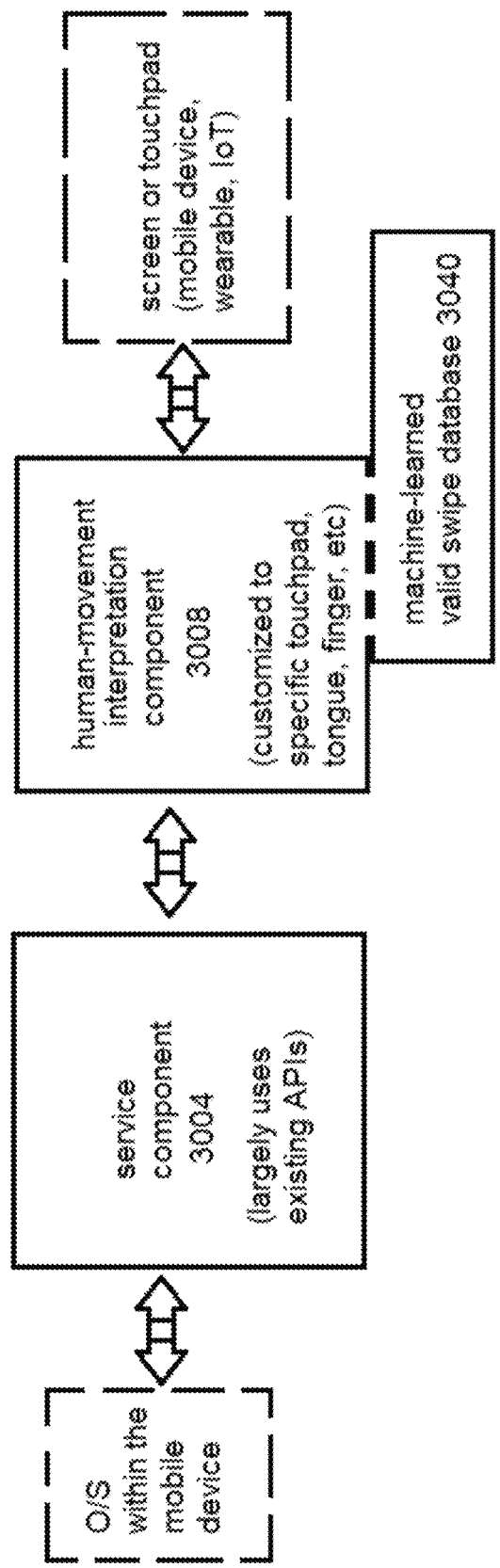
FIG. 30A shows a non-limiting configuration of computer/software modules that may be implemented within the embodiments disclosed herein.

FIG. 30A shows a non-limiting configuration of computer/software modules that may be implemented within the embodiments disclosed herein. Specifically, FIG. 30A shows a block-diagram of an embodiment 3000 working within a mobile computing device, comprising a keyboard service component 3004 and the human-movement interpretation component 3008.

The keyboard service component 3004 would be thought of as being closer to the O/S within the mobile device, e.g. Android or iOS. Meanwhile, the interpretation component 3008 would logically be located closer to the hardware of the mobile device, e.g. its screen or touchpad, and would be familiar with a user's specific inputs and style of finger-gestures and data entry. The two components 3004 and 3008 would work together to properly interpret the finger-gesture or data-entry by a user, and then package it in a way that would make sense and provide useful information to the mobile device. The human-movement component 3008 would, among other tasks, populate a machine-learned valid swipe database 3040.

As stated, the embodiments herein can be compiled for a variety of hardware, firmware, and Operating System (O\S) platforms. At the time of drafting of this disclosure, two of the most prominent O\S are Android and iOS, so these will be used as non-limiting examples. Android applications are written either in Java, a high level language with heavy abstraction, easy and wide spread use in application development for many systems, or C, a low level language, tighter control of every aspect of the program, significantly better performance possible. Meanwhile, iOS applications use Objective C, which acts a bridge between C code and higher level languages such as C++ and Java, and potentially C.

Development for the embodiments herein would utilize a combination of modules built with both high level and low level languages, and would utilize various mechanisms to connect the two modules. One development-model would utilize the higher-level language to integrate with existing APIs in whichever O\S. For example, the high level language may implement the keyboard service component 3004, configure and control the interpreter component 3008, and map interpreter events to keystrokes/functions (retaining the ability to customize). Meanwhile, a low-level language might be used to receive and interpret the users input (determining what is a valid swipe) and thus perform any machine learning required. A lower-level language would be more suitable for these tasks, as the process of interpreting, storing, and managing user-input requires greater performance and efficiency. As such, the computing device or "machine" does some type of "learning" about each user, hence the expression "machine learning". Accordingly, within this disclosure, the valid swipe database 3040 will sometimes be referred to as the machine learning database 3040.

Figure 30B:
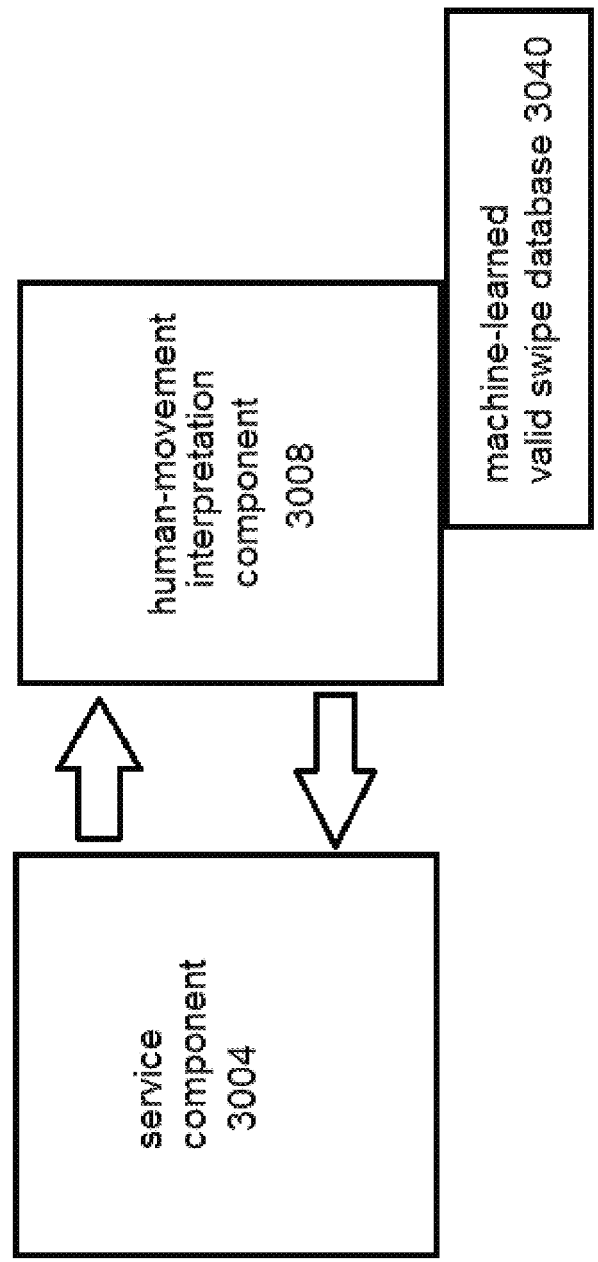
FIG. 30B shows more detail of the modules shown in FIG. 30A.

FIG. 30B shows more detail about the embodiment shown in FIG. 30A. FIG. 30B shows examples of types of data that are required to be handed between the service and interpretation components. A lot of complex, proprietary information will be flowing in both directions, so that it is an important feature of the embodiments disclosed herein that the two components 3004 and 3008 work together well.

Data moving from service component 3004 to the interpreter component 3008 could include, but is not limited to:
control data—e.g. loading, closing, and resetting of the interpretation component 3008;
configuration data—information such as screen size, orientation, various tuning parameters e.g. specific requirements within different touch-screens and gesture-interpreters. One example might be a minimum distance to be considered an authentic "swipe", rather than a mere accidental touch;
definitions of valid swipes; and\or
saved learned information, i.e. setup and populate a machine learning valid swipe database 3040, which will vary widely depending on the specific user.

The above list is not meant to be considered as limiting, many other components could also be included.

Data moving from the interpreter component 3008 to the service component 3004 might include:
status;
valid swipe detected (or possibility thereof), likely the swipe index from a table within the valid swipe database 3040, including probability of a match; and\or
updates to valid swipe database 3040.

Again, the above list is not meant to be considered as limiting, many other data components could also be included.

In all embodiments, testing/debugging will be a very important aspect of the manufacturing and selling of the commercial products based on this disclosure. To that end, the interpreter component 3008 needs to be capable of learning and validating, that is, to have some ability to continually tune and adjust its interpretation to the particular user. Mobile screens can get cluttered or congested, especially with e.g. 5 finger-touch areas all active at the same time. Hopefully the zones are not touched at the same time, but still "active\enabled", meaning ready to be touched.

Consequently, the interpreter component 3008 is responsible for error-minimization, false-touch recognition, proposed touch-timings, etc.

Also, for those users with five fingers available, velocity of touch, linking to the built-in pressure sensor within most touch-screens may be employed. Lets say a user hits 'K' really hard, e.g. 3× as hard as a usual stroke. That specific stroke could be an alt-mode to substitute say "Kansas" for the mere letter K. The embodiments herein will make use of haptic sensing\feedback, management of user-input, etc. For the mobile platform embodiments, the mobile app will have the ability to ask permission to use the Accelerometer, and also ask permission to use GPS. These error-awareness and user-data and metadata might make the difference between 'great product' and one that does not have good "mouth control" or good "paw control".

Figure 31:
FIG. 31 shows a Prior Art example of a hand that is deformed through a mountain-climbing accident.

An example of such a paw is shown in FIG. 31, in which an example of a hand that is deformed through a mountain-climbing accident, birth defect or physical alteration. Specifically, FIG. 31 shows a 3-nub "paw" for a left hand. The touch-zone for such an appendage may need to be very different from conventional fingers. Because this technology is meant to track to moving touch points, accommodations may be made to address individuals were limited to the appendages they are able to move. The alternative is to use the system sequentially and make use of the available keystrokes provided with one stroke or two. The touch-zone may also require accommodation for people who have unusually high degrees of electric charge or lack thereof on their fingertips.

Body capacitance is the physical property of the human body. Like any other electrically-conductive object, a human body can store electric charge, if sufficiently insulated. Synthetic fabrics and friction can charge a human body to about 3 kV. Low potentials may not have any notable effect, but some electronic devices can be damaged by modest voltages of 100 volts. Similarly, consider a super-dry environment, like Las Vegas in January. Super dry, lots of dry carpet, so that people get little shocks whenever they touch e.g. a cat, or silverware. Lots of built up static discharge, soles of their shoes are rubberized, etc. The embodiments herein factor in humidity settings, and that various mobile devices may come with some way of detecting humidity, either directly or by integration with a local climate-control device. Where available, the embodiments disclosed herein will use and incorporate this information, ever-vigilant in the on-going battle to always be improving effectiveness at determining 1) what is an intentional touch, 2) what is a mere accident, and 3) properly interpreting 1) and properly discarding 2).

Notably, a combination of footwear with some sole materials, low humidity, and a dry carpet (synthetic fiber in particular) can cause footsteps to charge a person's body capacitance to as much as a few tens of kilovolts with respect to the earth. The human and surroundings then constitute a highly charged capacitor. While typical touch-screens account for this within known, long-established ranges, the embodiments disclosed herein will need to occasionally over-ride and re-set these limits. For example, the 3-nub paw in FIG. 31 likely has a very different amount of body-capacitance than what is present on a user having conventional fingers. The interpretation component 3008 works with and takes information from the touch-screen or other hardware which is in direct physical contact with the user, makes measurements, calibrates, and makes adjustments in order to work effectively, and to deliver useful, properly formatted convertible information to the mobile or other computing device (see e.g. FIGS. 30A, 30B).

Capacitance of a human body in normal surroundings is typically in the tens to low hundreds of picofarads, which is small by typical electronic standards. While humans are much larger than typical electronic components, they are also mostly separated by significant distance from other conductive objects. The Human Body Model for capacitance, as defined by the Electrostatic Discharge Association (ESDA) is a 100 pF capacitor in series with a 1.5 kΩ resistor. Due to the unusual circumstances of the various users of the embodiments disclosed herein, there will be wide variations from these models, as will be discussed in more detail at least with respect to FIG. 31, among other locations.

To address these and other problems, the interpreter component 3008 will accommodate unusual variations in body-capacitance, due to the embodiments being directed at persons with physical infirmities, whose body-capacitance may be distorted or unusual due to defect or injury.

The software application is coded with instructions to comply with the format detailed in the keystrokes described in FIG. 4, that will isolate distinct zone areas on a touch sensitive surface and track the touching of those zones, determine which zones are touched and the motion or direction of that touch and/or movement, and provide the prescribed output related to that touch. Motion may be determined from the initial point of contact to a predominance of movement in any direction. Distinct presses or taps on zones may also provide additional functionality.

At such time, the iPhone, Android, or other mobile device is a critical medical resource, and not recreational. In these embodiments, the recreational\social resources (e.g. Facebook) may be entirely removed.

Pressure sensitivity: both iOS and Android can do this, it is briefly mentioned. This will yield a number of input parameters required to do so:
 a number of simultaneous touches;
 for each touch observed, determine and store a location (using 2D coordinates e.g. X, Y), and also magnitude of pressure (how hard is the screen pressed);
 for each touch movement (swipe), the following either is an input from the O\S or is calculated by a calculation module;
 direction of movement, velocity of movement, velocity at end of movement (i.e. distinguishing between swipe to a stop or swipe off screen/lift their finger).

The raw input received from the screen, touchpad, or Virtual Reality device (see e.g. FIG. 30A) will be interpreted with a classification algorithm. One non-limiting example of a classification algorithm may be SVM (support vector machine). As shown in FIG. 29, a swipe interpretation task could include, for example, various of the following:
 filtering touch activity based on zone in screen;
 collecting touch data from beginning until the end of a user action swipe(s) completed;
 scaling data to match scale of swipe classification model database 3040 (adjustable for screen size, actual swipe length/duration/velocity);
 classifying scaled data;
 calculating probability of a match;
 processing classifier results (perhaps with extracted/subset of swipe info) with learning algorithm; and
 returning results.

An embodiment of a learning algorithm is also contemplated. Within that embodiment, one guiding principle is to do an effective analysis job when the probability of a match is close to 2 results, reinforce positive classification results (i.e. when the user does not subsequently correct the keystroke result) and downgrade the results when the user corrects. If a trend is observed (of course over some time), the learning algorithm can preemptively correct classifier results.

In considering swipes made with a finger, sometimes the swipe-area is thick, sometimes its thin. The embodiments herein, through the swipe interpreter component 3008, know how to take greasy fingers, and make a nice recognizable swipe-pattern that can be effectively compared with the stored database or table 3040. The embodiments know how to filter out and statistically approximate the swipe-intent of a thickness of a larger finger v. the thickness of a much smaller finger (e.g. small-boned woman or children), and always come up with a recognizable swipe-pattern. For example, the embodiments disclosed herein can obtain an "average" for a finger-size, including a disabled person with a 3-nub paw (see FIG. 31).

The "valid swipe database" 3040 likely will do extensive data-crunching and image-processing to store only the key components most likely to be intended by the user, and strip out the rest as noise. In other words, the interpreter component 3008 decides what to store, and aberrant data to discard. For example, this data might include swipe-counts, swipe-speeds, swipe-noise, including determine what to keep as accurate, what to strip out for being inaccurate. As part of the test or learning process, this involves getting the person to repeat their same swipe-motion e.g. 20-30 times, thereby resulting in a nice clear statistically validated average. Stripping out those times a user may cross a boundary line of a zone, and instead place higher-focus on the swipes where a user stays within a boundary, etc. In an embodiment, the stencil 2600 can help eliminate crossing of boundaries of swipe-zones, prevent extraneous data from ever occurring in the first place, thereby making the task of the interpreter component 3008 easier.

Some possible data-parameters may include dirt, body-capacitance, dirt on person's fingers, dirt on touch-screen, size of touch-zones (small-boned woman will want different touch-zones than NFL lineman, different speeds, different pressures, different body-capacitance, etc).

Keystrokes are also produced when a finger moves between one or more zones as demonstrated in FIG. 6. Some keystrokes such as number lock will also alter the various touch zones to provide different keystrokes such as shown in FIG. 3. The zones may be set at different levels to accommodate different size fingers or they may be user defined if desired. The zones may also be expanded to accommodate an entire hand and utilize a finger in each zone, as shown at least within FIG. 21.

Additionally, the software within the interpreter component 3008 may be utilized such as predictive analysis to auto complete likely words as used on conventional word-processing software. The interface can also be user-defined in order to provide a personally preferred configuration of a desired keystroke layout. Configurations could also accommodate custom sizing and variations in sensitivity preferred by differing users. Sensitivity could include detecting if the screen was poked, or if a gesture or movement was made, to allow the keyboard to remain dormant while making a selection on the screen or surface. Adjusting these sensitivities could be made while in a set-up or training mode, to help avoiding triggering of false codes or keystrokes. The "training mode" may detect variances in each person's fingertips include size, touch-force, sweatiness, body capacitance, oily fingers, humidity, and other conditions.

Although the backspace command (e.g. moving from zone 3 to zone 2) can erase mistaken keystrokes, the method of pressing or dragging the finger through all zones may be used to void a keystroke without generating one. One example of user customization may be to provide a full word or function that corresponds to a single or set of keystrokes in order to improve efficiency while typing. The interface could provide suggestions that may be tapped for selecting without being mistaken as a gesture for additional keystrokes.

In an embodiment, each zone would measure the general movement inside that zone and determine it the movement was forward or backward by analyzing the percentage of movement through measuring feedback of the sensitive device in all directions. If a clear difference is not detected, no keystroke will be made. Additionally, the keyboard may be set up as to require a specific gesture be made to activate or deactivate it in order to prevent accidental keystrokes. If desired, the keyboard may be made to ignore presses held for any duration to reduce errors or accidental presses.

Stencil Embodiment

As shown in FIGS. 26-27, a further embodiment comprises a type of rubberized braille-pad stencil-cover 2600 that may sit on top of the display, a type of cover that helps guide people's fingertips, helps block out wrong-touches, makes sure all detected finger touches\swipes only occur within the intended, designated zones, and acts as a stencil. This stencil-cover 2600 sits on would not be used for anything else, at least not while the stencil-cover 2600 is positioned on the device.

The holes 2604 in the stencil-cover 2600 correspond with touch-zones. The value of the stencil 2600 is to help separate the touch-zones, including from body-capacitance, and also to make the software achieve higher clarity and have less work to do. The physically-blocked areas are absolutely mechanically shielded from unwanted touches. They physically blocked areas could also have upraised surfaces and contours for assisting a user in learning the zones, acting as type of guide or braille.

Refurbished Embodiments (Cost-Savings, Dedicated Hardware, Etc)

A further embodiment will include use of old refurbished Mobile Devices that are only used for text-entry, perhaps have certain modules disabled or removed. This in turn lowers processing costs, and re-apportions resources for the high-data-intensity products packaged within the embodiments herein.

It is anticipated that installing embodiments on older Androids and iPhones that have downlevel O/S versions, having lots of outdated resources can be advantage. Lowering costs, enabling a lower-expense embodiment, take advantage of the plethora of expired or pre-owned iPhone hardware that people quickly discard, in light of the fact that some iPhones and Androids are not only utility devices, but also fashion items. Helpful for obtaining Medicare approval, and also useful for cost management as is necessary with insurance. This includes outdated browsers, outdated Internet connectivity stuff, etc. In various embodiments, the outdated nature of portions of the equipment will not be important, and in some cases will be an advantage. For example, the mobile device used in this context may not have any telephone capability at all, and will not be used for that purpose whatsoever. To the extent this is needed, such a user might have some other mobile computing device for that purposes. Freeing up the mobile computing device to not have this telephone responsibility, perhaps even removing these telephone-modules entirely, would greatly increase the device's processing power available to do the tasks necessary to fulfill the requirements of the embodiments disclosed herein.

It is possible that persons having physical disabilities may have less money to spend on computing equipment. Thus, taking costs out of medical equipment can increase their utility and value. In an embodiment, downlevel O/S and downlevel hardware may be used. In compiling for downlevel O/S versions, only requiring certain modules, strive to work with the APIs that have been with the O/S versions all along. Some of these older mobile devices could potentially still be very useful for texting only, SMS-only, zero e-mail embodiments. To a person with a disability or special needs, such equipment could still greatly increase their quality of life. These could be set up to function only over a cellular phone system, but not over the Internet (data-disabled, no data-plan). Or, only over Wi-Fi to the Internet, but with data-capability disabled for everything except e-mail, e.g. disabled for browsing and Facebook, and where no browser or Facebook or other mobile application can be installed in the first place. Or with no telephone capability whatsoever. In short, the specialized purposes of the embodiments herein go beyond typical recreational usages of mobile devices.

These embodiments can be implemented in a non-social, non-Web context, as a task-specific device and not a typical recreational Mobile Device. Removing the recreational, enjoyment-features from the Mobile Device (e.g. removing Chrome, perhaps removing all cloud-data-capability not directly related to the embodiments herein) means more memory and processor-resources available for the human-input recognition tasks which, as stated, are considerable. Especially for a disabled person, having e.g. loss of extremities due to e.g. diabetes, leprosy, frostbite, or other condition, for whom a mis-type could be very harmful and even fatal. A mis-swipe could stop medicine from flowing, could stop the wheelchair from working, or the wheelchair could be about to go down a flight of stairs, etc. A user could be having kidney failure and not able to alert his wife or Nurse just downstairs. Instead, a care-giver may find a patient unconscious, perhaps was pawing at a mobile device but the Facebook mobile application was using all the processor-resources. It is desired to avoid such a scenario, and the non-social non-recreational embodiments disclosed herein are one way to achieve this.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of facilitating data-entry into a computing device, comprising:
    positioning a plurality of swipe-zones within the computing device;
    locating the swipe-zones according to a plurality of predetermined swipe-zone criteria;
    customizing the predetermined swipe-zone criteria to correspond with activities that a specific handicapped user or user with limited physical capability can consistently generate;
    each user separately customizing the swipe-zones according to their own unique specific criteria and abilities;
    each user making various gestures or swipes and translating those gestures or swipes including by the direction of the swipe into swipe-data corresponding with some specific type of computer-data;
    coordinating the swipe-data to correspond with a predetermined swipe-to-data table, where the swipe-to-data table contains computer-data predetermined to correspond with that user to match with that user's swipe-data;
    extracting as much usable computer-data as possible from the specific individual user's unique swipes and gestures;
    finishing and editing the computer-data according to predetermined patterns and specifications that would match with the specific user's unique gestures and swipe-data;
    forwarding the finished, edited computer-data corresponding with the specific user's unique gestures and swipes to the computing device.

2. The method of claim 1, further comprising:
the user-gestures being swipes on a touchpad of the computing device.

3. The method of claim 1, further comprising:
the user-gestures being touchless gestures received by a virtual reality module in communication with the computing device.

4. The method of claim 1, further comprising:
the computer-data being text.

5. The method of claim 1, further comprising:
configuring one of the predetermined touch-zones criteria to be responsive to variations in user-characteristics.

6. The method of claim 5, further comprising:
a variation being physical coordination and motor control of a user.

7. The method of claim 1, further comprising:
configuring a human-movement interpretation component within the mobile or stationary computing device;
the human-movement interpretation component interpreting the gesture or swipe by a user; and
interpreting and then formatting the gesture or swipe in a way that would make sense and provide useful information such as swipe-data to a service component also located within the mobile or stationary computing device.

8. The method of claim 7, further comprising:
utilizing a high-level computer language to integrate with existing APIs in the human-movement interpretation component; and
utilizing a low-level language to receive and interpret user gestures.

9. The method of claim 7, further comprising:
the service component sending first data to the interpreter component, the first data comprising:
    configuration data such as screen size, orientation, various tuning parameters e.g. specific requirements within different touch-screens and gesture-interpreters, and definitions of valid swipes.

10. The method of claim 7, further comprising:
the interpreter component sending second data to the service component, the second data comprising:

whether a valid swipe, or possibility thereof, matching with a preconfigured swipe/gesture database has been detected, including probability of a match; and updating the swipe/gesture database.

11. The method of claim 7, further comprising:
the interpretation component working with and taking swipe-data information from the touch-screen or virtual interface which is in direct or virtual physical contact with the user;
measuring, calibrating, and making data-adjustments to the swipe-data in order to deliver properly formatted convertible information to the mobile or stationary computing device.

12. The method of claim 11, further comprising:
the interpretation component determining and measuring a number of simultaneous touches;
for each touch observed, the interpretation component determining and recording a location and also magnitude of pressure; and
calculating and storing direction of movement, velocity of movement, velocity at and end of movement as one of a plurality of components of the swipe data.

13. The method of claim 12, further comprising:
the interpretation component filtering touch activity based on zone in screen;
collecting user data from beginning until the end of a swipe thereby creating new swipe-data;
scaling the swipe-data to match a scale of swipe classification model database; and
classifying the scaled data.

14. The method of claim 13, further comprising:
calculating a probability of a match;
processing classifier results with a learning algorithm; and
returning result data to the computing device.

15. A method of configuring a computing device, comprising:
positioning five zones within a user interface peripheral conveying user keystroke data to a computing device;
configuring four of the zones to correspond with bidirectional-only swipe movements and configuring the fifth zone corresponding with four-way directional swipe movements by a user;
the swipe movements including the bidirectional-only swipe movements and the four-way directional gesture chords generating swipe-information;
the swipe-information comprising directional components associated with each of the bidirectional swipe movements and gesture chords;
interpreting the swipe information and creating a discrete output corresponding with a specific letter of the alphabet, punctuation symbol, other character or function typically found in a conventional keyboard; and processing and storing the discrete output; and
one or more of the plurality of zones supporting differing levels of directionality from another of the plurality of zones.

16. The method of claim 15, further comprising:
the swipe-movements having curved, non-straight-line arcs.

17. The method of claim 15, further comprising:
the swipe-movements spanning multiple zones.

18. The method of claim 15, further comprising:
the swipe-movements facilitating a first level shift.

19. The method of claim 15, further comprising:
the swipe-movements facilitating a first and second level shifts.

20. A method of configuring a computing device, comprising:
positioning five zones within a user interface conveying user keystroke data to a computing device;
configuring four of the zones to correspond with bidirectional-only swipe movements and configuring the fifth zone corresponding with four-way directional swipe movements by a user;
the swipe movements and gesture chords generating swipe-information as follows;
the four bidirectional zones corresponding with fore-fingers of a hand and the fifth four-way directional zone corresponding with a thumb of the same hand;
swiping down in any of the four fore-finger zones producing a first set of four alphabetic characters;
swiping up in each of the four fore-finger zones producing a second set of four different alphabetic characters;
swiping down in the four fore finger zones and simultaneously swiping down in the thumb zone produce a third set of four different alphabetic characters;
swiping up in any of the four fore-finger zones and simultaneously swiping down in the fifth (thumb) zone producing a fourth set of four different alphabetic characters;
swiping down in any of the four fore-finger zones and simultaneously swiping up in the fifth thumb zone producing a fifth set of four different characters;
swipes up in the fore finger zones and simultaneously swiping up in the thumb zone producing a sixth set of four different characters; and
swiping left or right in the fifth (thumb) zone producing a seventh set of two different-characters;
thus providing a discrete output of twenty six letters using exactly five zones;
one or more of the plurality of zones supporting differing levels of directionality from another of the plurality of zones; and
processing and storing the discrete output.

21. The method of claim 20, further comprising:
the zones being in multiple touch sensing areas and not just on a single touch screen.

22. The method of claim 20, further comprising:
within the step of positioning, substituting user input data for user keystroke data.

* * * * *